US012615656B2

(12) United States Patent
Dutta

(10) Patent No.: US 12,615,656 B2
(45) Date of Patent: Apr. 28, 2026

(54) ENHANCED WIDEBAND HIGH FREQUENCY (HF) DATA TRANSMISSION WITH ADAPTIVE INTERFERENCE AVOIDANCE

(71) Applicant: nXm Networks Inc., Alexandria, VA (US)

(72) Inventor: Santanu Dutta, Vienna, VA (US)

(73) Assignee: nXm Networks Inc., Alexandria, VA (US)

( * ) Notice: Subject to any disclaimer, the term of this patent is extended or adjusted under 35 U.S.C. 154(b) by 592 days.

(21) Appl. No.: 17/880,573

(22) Filed: Aug. 3, 2022

(65) Prior Publication Data

US 2023/0041870 A1     Feb. 9, 2023

Related U.S. Application Data

(60) Provisional application No. 63/259,670, filed on Aug. 4, 2021.

(51) Int. Cl.
*H04W 72/541* (2023.01)
*H04W 72/0453* (2023.01)

(52) U.S. Cl.
CPC ..... *H04W 72/541* (2023.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 9,985,805 B1 * | 5/2018 | Swenholt | .......... | H04L 25/03057 |
| 10,200,872 B2 * | 2/2019 | Sakhnini | .............. | H04L 5/0044 |
| 2010/0099449 A1 | 4/2010 | Borran et al. | | |

(Continued)

FOREIGN PATENT DOCUMENTS

| | | | | |
|---|---|---|---|---|
| CN | 111162806 A | * | 5/2020 | .......... H04B 1/1036 |
| EP | 1959626 A1 | | 8/2008 | |

(Continued)

OTHER PUBLICATIONS

English Translation of CN-111162806-A (Year: 2020).*

(Continued)

*Primary Examiner* — Saumit Shah
(74) *Attorney, Agent, or Firm* — The Marbury Law Group, PLLC

(57) ABSTRACT

Methods, devices, and system for Enhanced Wideband HF data transmission with adaptive interference avoidance and other improvements. Several embodiments describe a mesh network comprising a plurality of transmitting and receiving nodes in a congested band. The network senses the interference spectrum occupancies at a plurality of receiver nodes and synthesizes transmit waveforms at the transmit nodes so that the spectra of the transmit signals fit into the gaps of the interference spectra at the receiver nodes. The waveform is based on FDM, including OFDM, with adaptive tone suppression at the transmitter. The spectrum occupancy information at each node is continually shared in the background among all nodes using a low data rate, Fountain code with erasure sensing at the receivers, which guarantees robust delivery.

32 Claims, 16 Drawing Sheets

(56) References Cited

U.S. PATENT DOCUMENTS

| | | | |
|---|---|---|---|
| 2013/0028100 A1* | 1/2013 | Olgaard | H04L 1/24 |
| | | | 370/242 |
| 2013/0035128 A1 | 2/2013 | Chan et al. | |
| 2018/0020458 A1 | 1/2018 | Lopez et al. | |
| 2019/0013892 A1 | 1/2019 | Chen et al. | |
| 2021/0083697 A1* | 3/2021 | Venkatraman | H04B 1/04 |

FOREIGN PATENT DOCUMENTS

| | | | |
|---|---|---|---|
| WO | 2018/210438 A1 | 11/2018 | |
| WO | WO-2020134855 A1 * | 7/2020 | H04B 1/7102 |

OTHER PUBLICATIONS

Gott, et al., "Analysis of HF Interference with application to digital communications", IEE Proceedings, vol. 130, Pt. F, No. 5, pp. 452-485, (Aug. 1983).

S. Dutta, et al., "Correlation of HF interference spectra with range", IEE Proceedings, vol. 128, Pt. F, No. 4, pp. 193-202, (Aug. 1981).

Gott, et al., "Occupancy Measurements across the entire HF Spectrum," Propagation Aspects Of Frequency Sharing Interference And System Diversity, ed. H. Soicher, 405 pages, (Mar. 1983).

Stehle, et al., "HF channel occupancy and band congestion: The other-user interference problem", Radio Science, vol. 26, No. 4, pp. 959-970, (Aug. 1991).

Gott, G. F. and Green, P. R., "The Measurement And Modelling Of Hf Spectral Occupancy Over Northern Europe Using A Monopole Antenna, 1990-2001", University of Manchester report, 30 pages, (Aug. 2007).

International Search Report and Written Opinion of the International Searching Authority received in related International Application No. PCT/US22/39337 mailed Feb. 7, 2023.

The U.S. Patent and Trademark Office, "International Preliminary Report on Patentability", issued in related International Patent Application No. PCT/US2022/039337, mailed on May 9, 2024. (42 pages).

* cited by examiner

FIG. 2

| Row ID | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| 1 | 1 | 15 | 29 | 43 | 57 | 71 | 85 | 99 | 113 | 127 | 141 | 155 | 169 | 183 | 197 | 211 | 225 | 239 | 253 | 267 | 281 | 295 | 309 | 323 | 337 | 351 |
| 2 | 2 | 16 | 30 | 44 | 58 | 72 | 86 | 100 | 114 | 128 | 142 | 156 | 170 | 184 | 198 | 212 | 226 | 240 | 254 | 268 | 282 | 296 | 310 | 324 | 338 | 352 |
| 3 | 3 | 17 | 31 | 45 | 59 | 73 | 87 | 101 | 115 | 129 | 143 | 157 | 171 | 185 | 199 | 213 | 227 | 241 | 255 | 269 | 283 | 297 | 311 | 325 | 339 | 353 |
| 4 | 4 | 18 | 32 | 46 | 60 | 74 | 88 | 102 | 116 | 130 | 144 | 158 | 172 | 186 | 200 | 214 | 228 | 242 | 256 | 270 | 284 | 298 | 312 | 326 | 340 | 354 |
| 5 | 5 | 19 | 33 | 47 | 61 | 75 | 89 | 103 | 117 | 131 | 145 | 159 | 173 | 187 | 201 | 215 | 229 | 243 | 257 | 271 | 285 | 299 | 313 | 327 | 341 | 355 |
| 6 | 6 | 20 | 34 | 48 | 62 | 76 | 90 | 104 | 118 | 132 | 146 | 160 | 174 | 188 | 202 | 216 | 230 | 244 | 258 | 272 | 286 | 300 | 314 | 328 | 342 | 356 |
| 7 | 7 | 21 | 35 | 49 | 63 | 77 | 91 | 105 | 119 | 133 | 147 | 161 | 175 | 189 | 203 | 217 | 231 | 245 | 259 | 273 | 287 | 301 | 315 | 329 | 343 | 357 |
| 8 | 8 | 22 | 36 | 50 | 64 | 78 | 92 | 106 | 120 | 134 | 148 | 162 | 176 | 190 | 204 | 218 | 232 | 246 | 260 | 274 | 288 | 302 | 316 | 330 | 344 | 358 |
| 9 | 9 | 23 | 37 | 51 | 65 | 79 | 93 | 107 | 121 | 135 | 149 | 163 | 177 | 191 | 205 | 219 | 233 | 247 | 261 | 275 | 289 | 303 | 317 | 331 | 345 | 359 |
| 10 | 10 | 24 | 38 | 52 | 66 | 80 | 94 | 108 | 122 | 136 | 150 | 164 | 178 | 192 | 206 | 220 | 234 | 248 | 262 | 276 | 290 | 304 | 318 | 332 | 346 | 360 |
| 11 | 11 | 25 | 39 | 53 | 67 | 81 | 95 | 109 | 123 | 137 | 151 | 165 | 179 | 193 | 207 | 221 | 235 | 249 | 263 | 277 | 291 | 305 | 319 | 333 | 347 | 361 |
| 12 | 12 | 26 | 40 | 54 | 68 | 82 | 96 | 110 | 124 | 138 | 152 | 166 | 180 | 194 | 208 | 222 | 236 | 250 | 264 | 278 | 292 | 306 | 320 | 334 | 348 | 362 |
| 13 | 13 | 27 | 41 | 55 | 69 | 83 | 97 | 111 | 125 | 139 | 153 | 167 | 181 | 195 | 209 | 223 | 237 | 251 | 265 | 279 | 293 | 307 | 321 | 335 | 349 | 363 |
| 14 | 14 | 28 | 42 | 56 | 70 | 84 | 98 | 112 | 126 | 140 | 154 | 168 | 182 | 196 | 210 | 224 | 238 | 252 | 266 | 280 | 294 | 308 | 322 | 336 | 350 | 364 |

Column ID

FIG. 3

| Row ID | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| 1 | 0 | 1540 | 3080 | 4620 | 6160 | 7700 | 9240 | 10780 | 12320 | 13860 | 15400 | 16940 | 18480 | 20020 | 21560 | 23100 | 24640 | 26180 | 27720 | 29260 | 30800 | 32340 | 33880 | 35420 | 36960 | 38500 |
| 2 | 110 | 1650 | 3190 | 4730 | 6270 | 7810 | 9350 | 10890 | 12430 | 13970 | 15510 | 17050 | 18590 | 20130 | 21670 | 23210 | 24750 | 26290 | 27830 | 29370 | 30910 | 32450 | 33990 | 35530 | 37070 | 38610 |
| 3 | 220 | 1760 | 3300 | 4840 | 6380 | 7920 | 9460 | 11000 | 12540 | 14080 | 15620 | 17160 | 18700 | 20240 | 21780 | 23320 | 24860 | 26400 | 27940 | 29480 | 31020 | 32560 | 34100 | 35640 | 37180 | 38720 |
| 4 | 330 | 1870 | 3410 | 4950 | 6490 | 8030 | 9570 | 11110 | 12650 | 14190 | 15730 | 17270 | 18810 | 20350 | 21890 | 23430 | 24970 | 26510 | 28050 | 29590 | 31130 | 32670 | 34210 | 35750 | 37290 | 38830 |
| 5 | 440 | 1980 | 3520 | 5060 | 6600 | 8140 | 9680 | 11220 | 12760 | 14300 | 15840 | 17380 | 18920 | 20460 | 22000 | 23540 | 25080 | 26620 | 28160 | 29700 | 31240 | 32780 | 34320 | 35860 | 37400 | 38940 |
| 6 | 550 | 2090 | 3630 | 5170 | 6710 | 8250 | 9790 | 11330 | 12870 | 14410 | 15950 | 17490 | 19030 | 20570 | 22110 | 23650 | 25190 | 26730 | 28270 | 29810 | 31350 | 32890 | 34430 | 35970 | 37510 | 39050 |
| 7 | 660 | 2200 | 3740 | 5280 | 6820 | 8360 | 9900 | 11440 | 12980 | 14520 | 16060 | 17600 | 19140 | 20680 | 22220 | 23760 | 25300 | 26840 | 28380 | 29920 | 31460 | 33000 | 34540 | 36080 | 37620 | 39160 |
| 8 | 770 | 2310 | 3850 | 5390 | 6930 | 8470 | 10010 | 11550 | 13090 | 14630 | 16170 | 17710 | 19250 | 20790 | 22330 | 23870 | 25410 | 26950 | 28490 | 30030 | 31570 | 33110 | 34650 | 36190 | 37730 | 39270 |
| 9 | 880 | 2420 | 3960 | 5500 | 7040 | 8580 | 10120 | 11660 | 13200 | 14740 | 16280 | 17820 | 19360 | 20900 | 22440 | 23980 | 25520 | 27060 | 28600 | 30140 | 31680 | 33220 | 34760 | 36300 | 37840 | 39380 |
| 10 | 990 | 2530 | 4070 | 5610 | 7150 | 8690 | 10230 | 11770 | 13310 | 14850 | 16390 | 17930 | 19470 | 21010 | 22550 | 24090 | 25630 | 27170 | 28710 | 30250 | 31790 | 33330 | 34870 | 36410 | 37950 | 39490 |
| 11 | 1100 | 2640 | 4180 | 5720 | 7260 | 8800 | 10340 | 11880 | 13420 | 14960 | 16500 | 18040 | 19580 | 21120 | 22660 | 24200 | 25740 | 27280 | 28820 | 30360 | 31900 | 33440 | 34980 | 36520 | 38060 | 39600 |
| 12 | 1210 | 2750 | 4290 | 5830 | 7370 | 8910 | 10450 | 11990 | 13530 | 15070 | 16610 | 18150 | 19690 | 21230 | 22770 | 24310 | 25850 | 27390 | 28930 | 30470 | 32010 | 33550 | 35090 | 36630 | 38170 | 39710 |
| 13 | 1320 | 2860 | 4400 | 5940 | 7480 | 9020 | 10560 | 12100 | 13640 | 15180 | 16720 | 18260 | 19800 | 21340 | 22880 | 24420 | 25960 | 27500 | 29040 | 30580 | 32120 | 33660 | 35200 | 36740 | 38280 | 39820 |
| 14 | 1430 | 2970 | 4510 | 6050 | 7590 | 9130 | 10670 | 12210 | 13750 | 15290 | 16830 | 18370 | 19910 | 21450 | 22990 | 24530 | 26070 | 27610 | 29150 | 30690 | 32230 | 33770 | 35310 | 36850 | 38390 | 39930 |

Column ID

13 SUM channels, batch 1

| Row ID | Column ID | | | | | | | | | | | | | | | | | | | | | | | | | |
|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 1 | 1 | 15 | 29 | 43 | 57 | 71 | 85 | 99 | 113 | 127 | 141 | 155 | 169 | 183 | 197 | 211 | 225 | 239 | 253 | 267 | 281 | 295 | 309 | 323 | 337 | 351 |
| 2 | 2 | 16 | 30 | 44 | 58 | 72 | 86 | 100 | 114 | 128 | 142 | 156 | 170 | 184 | 198 | 212 | 226 | 240 | 254 | 268 | 282 | 296 | 310 | 324 | 338 | 352 |
| 3 | 3 | 17 | 31 | 45 | 59 | 73 | 87 | 101 | 115 | 129 | 143 | 157 | 171 | 185 | 199 | 213 | 227 | 241 | 255 | 269 | 283 | 297 | 311 | 325 | 339 | 353 |
| 4 | 4 | 18 | 32 | 46 | 60 | 74 | 88 | 102 | 116 | 130 | 144 | 158 | 172 | 186 | 200 | 214 | 228 | 242 | 256 | 270 | 284 | 298 | 312 | 326 | 340 | 354 |
| 5 | 5 | 19 | 33 | 47 | 61 | 75 | 89 | 103 | 117 | 131 | 145 | 159 | 173 | 187 | 201 | 215 | 229 | 243 | 257 | 271 | 285 | 299 | 313 | 327 | 341 | 355 |
| 6 | 6 | 20 | 34 | 48 | 62 | 76 | 90 | 104 | 118 | 132 | 146 | 160 | 174 | 188 | 202 | 216 | 230 | 244 | 258 | 272 | 286 | 300 | 314 | 328 | 342 | 356 |
| 7 | 7 | 21 | 35 | 49 | 63 | 77 | 91 | 105 | 119 | 133 | 147 | 161 | 175 | 189 | 203 | 217 | 231 | 245 | 259 | 273 | 287 | 301 | 315 | 329 | 343 | 357 |
| 8 | 8 | 22 | 36 | 50 | 64 | 78 | 92 | 106 | 120 | 134 | 148 | 162 | 176 | 190 | 204 | 218 | 232 | 246 | 260 | 274 | 288 | 302 | 316 | 330 | 344 | 358 |
| 9 | 9 | 23 | 37 | 51 | 65 | 79 | 93 | 107 | 121 | 135 | 149 | 163 | 177 | 191 | 205 | 219 | 233 | 247 | 261 | 275 | 289 | 303 | 317 | 331 | 345 | 359 |
| 10 | 10 | 24 | 38 | 52 | 66 | 80 | 94 | 108 | 122 | 136 | 150 | 164 | 178 | 192 | 206 | 220 | 234 | 248 | 262 | 276 | 290 | 304 | 318 | 332 | 346 | 360 |
| 11 | 11 | 25 | 39 | 53 | 67 | 81 | 95 | 109 | 123 | 137 | 151 | 165 | 179 | 193 | 207 | 221 | 235 | 249 | 263 | 277 | 291 | 305 | 319 | 333 | 347 | 361 |
| 12 | 12 | 26 | 40 | 54 | 68 | 82 | 96 | 110 | 124 | 138 | 152 | 166 | 180 | 194 | 208 | 222 | 236 | 250 | 264 | 278 | 292 | 306 | 320 | 334 | 348 | 362 |
| 13 | 13 | 27 | 41 | 55 | 69 | 83 | 97 | 111 | 125 | 139 | 153 | 167 | 181 | 195 | 209 | 223 | 237 | 251 | 265 | 279 | 293 | 307 | 321 | 335 | 349 | 363 |
| 14 | 14 | 28 | 42 | 56 | 70 | 84 | 98 | 112 | 126 | 140 | 154 | 168 | 182 | 196 | 210 | 224 | 238 | 252 | 266 | 280 | 294 | 308 | 322 | 336 | 350 | 364 |

13 SUM channels, batch 2

| Row ID | Column ID | | | | | | | | | | | | | | | | | | | | | | | | | |
|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 1 | 1 | 15 | 29 | 43 | 57 | 71 | 85 | 99 | 113 | 127 | 141 | 155 | 169 | 183 | 197 | 211 | 225 | 239 | 253 | 267 | 281 | 295 | 309 | 323 | 337 | 351 |
| 2 | 2 | 16 | 30 | 44 | 58 | 72 | 86 | 100 | 114 | 128 | 142 | 156 | 170 | 184 | 198 | 212 | 226 | 240 | 254 | 268 | 282 | 296 | 310 | 324 | 338 | 352 |
| 3 | 3 | 17 | 31 | 45 | 59 | 73 | 87 | 101 | 115 | 129 | 143 | 157 | 171 | 185 | 199 | 213 | 227 | 241 | 255 | 269 | 283 | 297 | 311 | 325 | 339 | 353 |
| 4 | 4 | 18 | 32 | 46 | 60 | 74 | 88 | 102 | 116 | 130 | 144 | 158 | 172 | 186 | 200 | 214 | 228 | 242 | 256 | 270 | 284 | 298 | 312 | 326 | 340 | 354 |
| 5 | 5 | 19 | 33 | 47 | 61 | 75 | 89 | 103 | 117 | 131 | 145 | 159 | 173 | 187 | 201 | 215 | 229 | 243 | 257 | 271 | 285 | 299 | 313 | 327 | 341 | 355 |
| 6 | 6 | 20 | 34 | 48 | 62 | 76 | 90 | 104 | 118 | 132 | 146 | 160 | 174 | 188 | 202 | 216 | 230 | 244 | 258 | 272 | 286 | 300 | 314 | 328 | 342 | 356 |
| 7 | 7 | 21 | 35 | 49 | 63 | 77 | 91 | 105 | 119 | 133 | 147 | 161 | 175 | 189 | 203 | 217 | 231 | 245 | 259 | 273 | 287 | 301 | 315 | 329 | 343 | 357 |
| 8 | 8 | 22 | 36 | 50 | 64 | 78 | 92 | 106 | 120 | 134 | 148 | 162 | 176 | 190 | 204 | 218 | 232 | 246 | 260 | 274 | 288 | 302 | 316 | 330 | 344 | 358 |
| 9 | 9 | 23 | 37 | 51 | 65 | 79 | 93 | 107 | 121 | 135 | 149 | 163 | 177 | 191 | 205 | 219 | 233 | 247 | 261 | 275 | 289 | 303 | 317 | 331 | 345 | 359 |
| 10 | 10 | 24 | 38 | 52 | 66 | 80 | 94 | 108 | 122 | 136 | 150 | 164 | 178 | 192 | 206 | 220 | 234 | 248 | 262 | 276 | 290 | 304 | 318 | 332 | 346 | 360 |
| 11 | 11 | 25 | 39 | 53 | 67 | 81 | 95 | 109 | 123 | 137 | 151 | 165 | 179 | 193 | 207 | 221 | 235 | 249 | 263 | 277 | 291 | 305 | 319 | 333 | 347 | 361 |
| 12 | 12 | 26 | 40 | 54 | 68 | 82 | 96 | 110 | 124 | 138 | 152 | 166 | 180 | 194 | 208 | 222 | 236 | 250 | 264 | 278 | 292 | 306 | 320 | 334 | 348 | 362 |
| 13 | 13 | 27 | 41 | 55 | 69 | 83 | 97 | 111 | 125 | 139 | 153 | 167 | 181 | 195 | 209 | 223 | 237 | 251 | 265 | 279 | 293 | 307 | 321 | 335 | 349 | 363 |
| 14 | 14 | 28 | 42 | 56 | 70 | 84 | 98 | 112 | 126 | 140 | 154 | 168 | 182 | 196 | 210 | 224 | 238 | 252 | 266 | 280 | 294 | 308 | 322 | 336 | 350 | 364 |

FIG. 4

| Row ID | Column ID | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 1 | 0 | 1540 | 3080 | 4620 | 6160 | 7700 | 9240 | 10780 | 12320 | 13860 | 15400 | 16940 | 18480 | 20020 | 21560 | 23100 | 24640 | 26180 | 27720 | 29260 | 30800 | 32340 | 33880 | 35420 | 36960 |
| 2 | 110 | 1650 | 3190 | 4730 | 6270 | 7810 | 9350 | 10890 | 12430 | 13970 | 15510 | 17050 | 18590 | 20130 | 21670 | 23210 | 24750 | 26290 | 27830 | 29370 | 30910 | 32450 | 33990 | 35530 | 37070 |
| 3 | 220 | 1760 | 3300 | 4840 | 6380 | 7920 | 9460 | 11000 | 12540 | 14080 | 15620 | 17160 | 18700 | 20240 | 21780 | 23320 | 24860 | 26400 | 27940 | 29480 | 31020 | 32560 | 34100 | 35640 | 37180 |
| 4 | 330 | 1870 | 3410 | 4950 | 6490 | 8030 | 9570 | 11110 | 12650 | 14190 | 15730 | 17270 | 18810 | 20350 | 21890 | 23430 | 24970 | 26510 | 28050 | 29590 | 31130 | 32670 | 34210 | 35750 | 37290 |
| 5 | 440 | 1980 | 3520 | 5060 | 6600 | 8140 | 9680 | 11220 | 12760 | 14300 | 15840 | 17380 | 18920 | 20460 | 22000 | 23540 | 25080 | 26620 | 28160 | 29700 | 31240 | 32780 | 34320 | 35860 | 37400 |
| 6 | 550 | 2090 | 3630 | 5170 | 6710 | 8250 | 9790 | 11330 | 12870 | 14410 | 15950 | 17490 | 19030 | 20570 | 22110 | 23650 | 25190 | 26730 | 28270 | 29810 | 31350 | 32890 | 34430 | 35970 | 37510 |
| 7 | 660 | 2200 | 3740 | 5280 | 6820 | 8360 | 9900 | 11440 | 12980 | 14520 | 16060 | 17600 | 19140 | 20680 | 22220 | 23760 | 25300 | 26840 | 28380 | 29920 | 31460 | 33000 | 34540 | 36080 | 37620 |
| 8 | 770 | 2310 | 3850 | 5390 | 6930 | 8470 | 10010 | 11550 | 13090 | 14630 | 16170 | 17710 | 19250 | 20790 | 22330 | 23870 | 25410 | 26950 | 28490 | 30030 | 31570 | 33110 | 34650 | 36190 | 37730 |
| 9 | 880 | 2420 | 3960 | 5500 | 7040 | 8580 | 10120 | 11660 | 13200 | 14740 | 16280 | 17820 | 19360 | 20900 | 22440 | 23980 | 25520 | 27060 | 28600 | 30140 | 31680 | 33220 | 34760 | 36300 | 37840 |
| 10 | 990 | 2530 | 4070 | 5610 | 7150 | 8690 | 10230 | 11770 | 13310 | 14850 | 16390 | 17930 | 19470 | 21010 | 22550 | 24090 | 25630 | 27170 | 28710 | 30250 | 31790 | 33330 | 34870 | 36410 | 37950 |
| 11 | 1100 | 2640 | 4180 | 5720 | 7260 | 8800 | 10340 | 11880 | 13420 | 14960 | 16500 | 18040 | 19580 | 21120 | 22660 | 24200 | 25740 | 27280 | 28820 | 30360 | 31900 | 33440 | 34980 | 36520 | 38060 |
| 12 | 1210 | 2750 | 4290 | 5830 | 7370 | 8910 | 10450 | 11990 | 13530 | 15070 | 16610 | 18150 | 19690 | 21230 | 22770 | 24310 | 25850 | 27390 | 28930 | 30470 | 32010 | 33550 | 35090 | 36630 | 38170 |
| 13 | 1320 | 2860 | 4400 | 5940 | 7480 | 9020 | 10560 | 12100 | 13640 | 15180 | 16720 | 18260 | 19800 | 21340 | 22880 | 24420 | 25960 | 27500 | 29040 | 30580 | 32120 | 33660 | 35200 | 36740 | 38280 |
| 14 | 1430 | 2970 | 4510 | 6050 | 7590 | 9130 | 10670 | 12210 | 13750 | 15290 | 16830 | 18370 | 19910 | 21450 | 22990 | 24530 | 26070 | 27610 | 29150 | 30690 | 32230 | 33770 | 35310 | 36850 | 38390 |

Relative frequency from left edge of channel (Hz)

0   220   880   1210   1870   3520   4290   9240   13860   17820   18810   21890   22550   37730   38280   40040

Fine Spectrum Occupancy (not to scale)

| k \ n | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | 1 | 1 | | | | 0 | | | | 1 | | | 1 | | | | |
| 2 | 1 | 1 | | | | 0 | | | | 1 | | | 1 | | | | |
| 3 | 0 | 0 | | | | | | | | 1 | | | 0 | | | | |
| 4 | 0 | 1 | | | | 1 | | | | 0 | | | 0 | | | | |
| 5 | 1 | 1 | . | . | . | 1 | . | . | . | 1 | . | . | 0 | . | . | . | . |
| 6 | 0 | 1 | | | | 1 | | | | 0 | | | 1 | | | | |
| 7 | 0 | 0 | | | | 0 | | | | 1 | | | 0 | | | | |
| 8 | 1 | 0 | | | | 0 | | | | 1 | | | 1 | | | | |
| 9 | 1 | 1 | | | | 0 | | | | 1 | | | 1 | | | | |
| 10 | 0 | 0 | | | | 1 | | | | 1 | | | 1 | | | | |
| 11 | 1 | 0 | | | | 1 | | | | 0 | | | 1 | | | | |
| 12 | 1 | 0 | | | | 1 | | | | 0 | | | 0 | | | | |
| 13 | 0 | 1 | | | | 0 | | | | 0 | | | 1 | | | | |

Source Data Packets $s_k$

Encoded data packets $t_n$

1002

Input Interleaving Block

1004

G-Matrix Generator

1006

Inner Product $$t_n = \Sigma \, [s_k]^T . [G_{kn}]$$

1008

Output Interleaving Block

GPS Clock $[G_{kn}]$ matrix columns (k random bits)

1100

Recieved data packets $t_n$

Decoded Data Packets $s_k$

1102

Recieved
Interleaving Block

1104

Inverse Of G-Matrix
Generator

GPS Clock $[G_{kn}]^{-1}$ matrix columns
(k random bits)

1106

Inner Product $s_k = \Sigma \, [t_n]^T \, [G_{nk}]^{-1}$

1108

Decoded
Interleaving Block

1200

| 1202 | 1206 | 1208 |
|---|---|---|

Receive Other-Node SUM Data

1204

Own-Node SUM Data Assessor

Data Sink

Determine SCs To Be Suppressed, MODCODE For SCs To Be Utilized, Etc.

SUM Data To Be Shared With Other Nodes

Traffic Packet

Suppressed Subcarriers

1210

Create Input Interleaving Block

1212

Fetch Column Data From Stored [G]

Decoded Data Packets $S_k$ $N^{th}$ Column Of [G]

1214

Perform Inner Product

Fountain Code Encoded Packet

1216

Populate Output Interleaving Block

1218

Input To Modulator Of Transmitter Subsystem

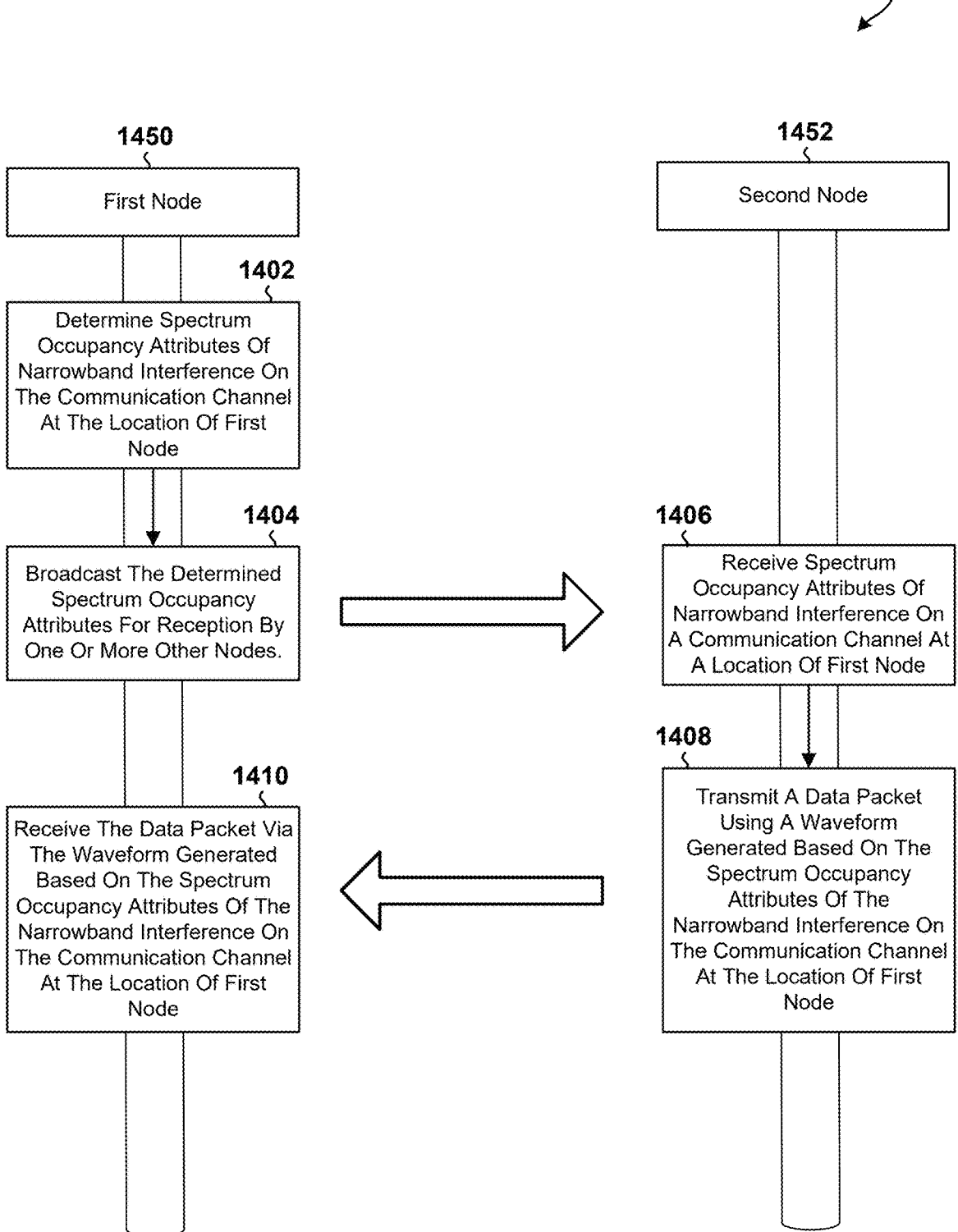

1450
First Node

1402
Determine Spectrum Occupancy Attributes Of Narrowband Interference On The Communication Channel At The Location Of First Node

1404
Broadcast The Determined Spectrum Occupancy Attributes For Reception By One Or More Other Nodes.

1410
Receive The Data Packet Via The Waveform Generated Based On The Spectrum Occupancy Attributes Of The Narrowband Interference On The Communication Channel At The Location Of First Node

1452
Second Node

1406
Receive Spectrum Occupancy Attributes Of Narrowband Interference On A Communication Channel At A Location Of First Node

1408
Transmit A Data Packet Using A Waveform Generated Based On The Spectrum Occupancy Attributes Of The Narrowband Interference On The Communication Channel At The Location Of First Node

ENHANCED WIDEBAND HIGH FREQUENCY (HF) DATA TRANSMISSION WITH ADAPTIVE INTERFERENCE AVOIDANCE

RELATED APPLICATIONS

This application claims the benefit of priority to U.S. Provisional Application No. 63/259,670, entitled "Enhanced wideband HF data transmission with adaptive interference avoidance and other improvements" filed Aug. 4, 2021, the entire content of which is hereby incorporated by reference for all purposes.

BACKGROUND

The 3-30 MHz High Frequency (HF) band has been used from the earliest days of radio communication. Despite revolutionary advances in other radio technologies, HF has retained its value because it enables beyond-horizon communication links without satellites. The communication link may be provided by bouncing signals off the ionosphere, the main layers (D, E and F) residing approximately 50-450 km above the Earth's surface. The D layer is mainly an absorptive layer and is locally present mostly by day. The E and F layers are the main reflective layers and locally occupy different heights depending on the local time of day, supporting different path geometries. In addition to lower cost, the survivability of the ionosphere makes HF attractive to the military.

SUMMARY

The various aspects include methods of communicating data packets through a wireless communication network, which may include receiving, by a transceiver device from a receiver device, spectrum occupancy attributes of narrowband interference on a communication channel at a location of the receiver device, and transmitting, from the transceiver device to the receiver device, a data packet using a waveform generated based on the spectrum occupancy attributes of the narrowband interference on the communication channel at the location of the receiver device.

In some aspects, transmitting the data packet using the waveform generated based on the spectrum occupancy attributes of the narrowband interference on the communication channel at the location of the receiver device may include transmitting the data packet using a frequency division multiplexed waveform including a plurality of subcarriers and suppressing at least some of the subcarriers from transmission based on the spectrum occupancy attributes of the narrowband interference on the communication channel, and assigning user data to be carried only by the transmitted subcarriers. In some aspects, transmitting the data packet using the frequency division multiplexed waveform including the plurality of subcarriers may include transmitting the data packet using a frequency division multiplexed waveform that includes a plurality of mutually orthogonal subcarriers, in which each of the mutually orthogonal subcarriers is modulated with a subset of the data contained in one transmit interleaving block.

In some aspects, the methods may further include applying power saved by suppressing the subcarriers towards transmitting the subcarriers that have not been suppressed. In some aspects, transmitting the data packet using the waveform generated based on the spectrum occupancy attributes of the narrowband interference on the communication channel at the location of the receiver device may include selecting a modulation and coding scheme for each transmitted subcarrier based on an interference power within spectrum occupied by the subcarrier at the receiver device. In some aspects, transmitting the data packet using the waveform generated based on the spectrum occupancy attributes of the narrowband interference on the communication channel at the location of the receiver device may include generating the waveform based on the spectrum occupancy attributes of the narrowband interference on the communication channel at the location of the transceiver device.

In some aspects, the methods may further include determining, by the transceiver device, spectrum occupancy attributes of narrowband interference on the communication channel at the location of the transceiver device, and broadcasting, by the transceiver device, the determined spectrum occupancy attributes for reception by one or more other devices. In some aspects, determining the spectrum occupancy attributes of the narrowband interference on the communication channel may include sensing the power spectral density of the narrowband interference during a period of radio silence, and generating a spectrum usability mask from the sensed power spectral density. In some aspects, determining the spectrum occupancy attributes of narrowband interference on the communication channel at the location of the receiver device may include computing a power spectral density of the waveform based on a discrete Fourier transform (or based on a fast Fourier transform) and generating a spectrum usability mask by quantizing the power spectral density relative to a set of threshold values. In some aspects, generating the spectrum usability mask by quantizing the power spectral density relative to the set of threshold values may include identifying a threshold level of interference power received by a known subcarrier that is not exceeded when averaged over a known period of time. In some aspects, generating the spectrum usability mask by quantizing the power spectral density relative to the set of threshold values may include identifying upper and lower threshold limits of interference power received by a known subcarrier such that, when the interference power is averaged over a known period of time, a value of the average interference power is bounded by the upper and lower threshold limits.

In some aspects, the methods may further include generating a demodulated data set by demodulating modulated data carried by subcarriers in the waveform, and erasing data carried by the subcarriers of the waveform that include cochannel interference. In some aspects, the methods may further include generating a demodulated data set by demodulating modulated data carried by subcarriers in the waveform, determining whether the demodulated data set includes a demodulated data packet that includes an uncorrected error, and erasing the demodulated data packet in response to determining that the demodulated data set includes the demodulated data packet that includes the uncorrected error. In some aspects, the methods may further include identifying packets that are free of errors, maintaining a first count of the number of packets received in the receiver device, and maintaining a second count of the number of packets received error free in the receiver device.

In some aspects, the communication channel may include a plurality of discontiguous subchannels in the radio spectrum (the subchannels having arbitrary bandwidths), and the methods may further include aggregating, by a transceiver device, the plurality of discontiguous subchannels to form a contiguous channel at an intermediate frequency. In some aspects, the intermediate frequency in the transceiver device may be zero (0) Hz, and the signals may be represented in the transceiver device in complex baseband form.

Further aspects may include methods of communicating a file including a finite number of source data packets through a frequency division multiplexed wireless communication channel that is partially occupied by narrowband interference, which may include using, by a transceiver device, a fountain code to encode the source data packets, transmitting, by the transceiver device to a receiver device, the encoded data packets using all subcarriers, regardless of whether they are encountering interference at the receiver, and continuing to transmit, by the transceiver device to the receiver device, the encoded packets until a notice of acknowledgement of file delivery or a notice of failure of file delivery is received.

In some aspects, the methods may further include receiving encoded data packets, identifying the received packets that are free of errors, keeping a first count of the number of received packets, and keeping a second count of the number of the received packets that are free of errors. In some aspects, the methods may further include decoding the file of transmitted encoded data packets in response to determining that the second count exceeds a threshold. In some aspects, the methods may further include abandoning the decoding attempts for the file in response to determining that the first count exceeds a threshold value.

In some aspects, the methods may further include erasing a received packet based on spectrum occupancy attributes of narrowband interference on a communication channel at a location of the transceiver device. In some aspects, the methods may further include performing a cyclic redundancy check test on a demodulated packet, and erasing the demodulated packet in response to determining that the demodulated packet failed the cyclic redundancy check test.

In some aspects, the file may include information about the spectral occupancy of interference received by the transceiver device, and the method may further include broadcasting spectral occupancy information for reception by a plurality of other transceivers. In some aspects, the file may further include user data, and the method may further include broadcasting the file for reception by a plurality of receiving transceivers having dissimilar interference spectral occupancies at their locations.

Further aspects may include a transceiver device configured to perform various operations corresponding to the methods discussed above.

Further aspects may include a computing device (or transceiver device) having a processor configured with processor-executable instructions to perform various operations corresponding to the methods discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, explain the features of the invention.

FIG. 2 is a table diagram that illustrates a table that could be used for the identification of subcarriers (SC) by an identification (ID) number in accordance with some embodiments.

FIG. 3 is a table diagram that illustrates a table that could be used for the identification of subcarriers (SC) by its transmission frequency, referenced to the left (lower frequency) edge of the nominal (40.040 kHz bandwidth) channel.

FIG. 4 is a table diagram that illustrates a table that could be used to indicate that, out of the 364 subcarriers, two sets of 13 subcarriers (batch 1 and batch 2 shown shaded) may be dedicated to broadcasting the receiver's SUM data.

FIG. 9 is an illustration of an example of a [G] matrix that could be generated in some embodiments.

FIG. 12 is a process flow diagram that illustrates a method of processing packets for transmission in accordance with some embodiments.

FIG. 14 is a process flow diagram that illustrates a method of communicating data packets through a wireless communication network in accordance with some embodiments.

DETAILED DESCRIPTION

Figure 1:
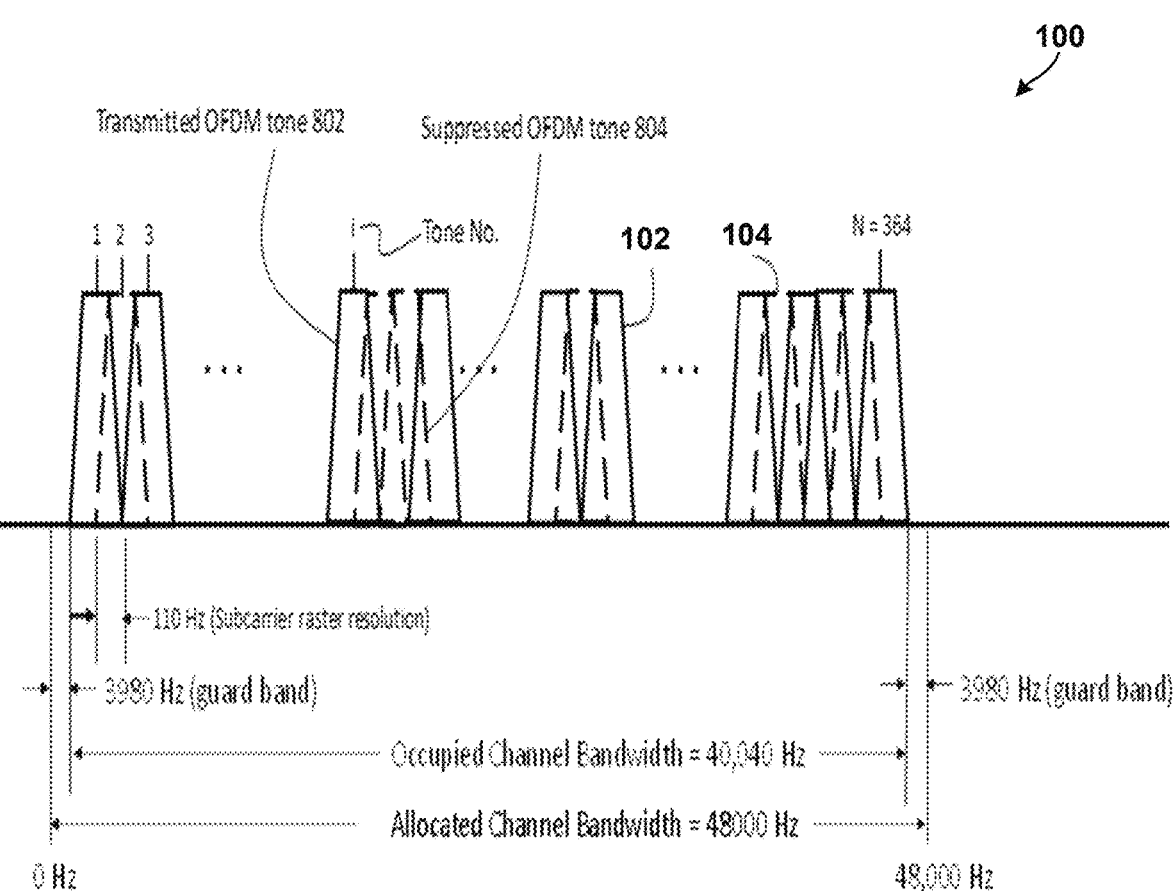
FIG. 1 is a signal spectrum diagram that illustrates an example multicarrier orthogonal frequency division multiplexed (OFDM) waveform that could be generated to include a spectrum occupancy that adaptively avoids the spectrum occupancy of the interference in accordance with some embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

In overview, the various embodiments include methods, and components (e.g., computing device, transceiver, transmitter, receiver, modem processor, etc.) configured to implement the methods, for wirelessly communicating information (e.g., a file, data packets, etc.). In some embodiments, the information may be communicated over a high frequency (HF) channel (i.e., 3-30 MHz), which may be partially occupied by narrowband interference. Some components may be configured to mitigate the negative impacts of the narrowband interference by generating, encoding, transmitting, receiving, and/or decoding a waveform that includes a spectrum occupancy that adaptively avoids the spectrum occupancy of the interference. The use of such a waveform may reduce transmit power and/or increase throughput (compared to systems do not adapt to the spectrum occupancy of the interference at the receiver).

In some embodiments, the waveform may be a frequency division multiplexed waveform in which some of the subcarriers may be suppressed from transmission based on a spectrum usability mask. The power saved by suppressing subcarriers may be applied towards transmitting subcarriers that have not been suppressed.

In some embodiments, the components may be configured to determine the modulation and coding used for each subcarrier based on the interference power within the spectrum occupied by the subcarrier. In some embodiments, the components may be configured to identify and erase data from subcarriers that include co-channel interference power that is above a threshold value. In some embodiments, the components may be configured to identify and erase data packets that include uncorrected errors.

In some embodiments, the components may be configured to use a fountain code to encode data packets and transmit the encoded data packets using all subcarriers (regardless of whether they are encountering interference at the receiver) until the number of error free packets received at the receiver exceeds a threshold value. The receiver may maintain a count of the total number of packets received and a count of the number of error free packets received, which may be communicated back to the transmitter.

For ease of reference, some embodiments are described with reference to a transmitter or receiver. However, it should be understood that any or all of the embodiments discussed in this application may be implemented in a transceiver device or node that includes a transmitter, receiver, and/or transceiver, any or all of which may be included in or coupled to one or more processors (e.g., modem processor, applications processor, vector coprocessor, etc.).

The word "exemplary" is used herein to mean "serving as an example, instance, or illustration." Any implementation described herein as "exemplary" is not necessarily to be construed as preferred or advantageous over other implementations.

The phrase "narrowband interference" may be used herein to refer to instances of high frequency (HF) interference where congestion is materially less than 100%, for example, less than 75%. In other words, the interference is considered narrowband if, when observed through a 100 Hz bandwidth measurement bandwidth, or subband, over a contiguous span of at least 1 kHz, the power levels in at least 25% of the subbands are less than a threshold power value that is 10 dB above the atmospheric noise.

The term "maximum usable frequency (MUF)" may be used herein to refer to the highest radio frequency that can be used for transmission between two points via reflection from the ionosphere (skywave propagation) at a specified time, independent of transmitter power.

The term "optimum working frequency (OWF)" may be used herein to refer to an estimate of the maximum frequency that may be used for a given critical frequency and incident angle. A communication device may use the OWF to avoid the irregularities of the local atmospheric conditions. Predictions of OWF versus communication range are published by various agencies and are used for high frequency (HF) frequency planning, both in offline applications and automatic link establishment (ALE) software tools. The OWF predictions may depend on both the geographic region and the sunspot number. The latter has a 11-year cycle and represents the longest-term determinant of HF channel characteristics.

The ionosphere is the ionized part of the upper atmosphere of Earth, which influences radio propagation to distant places on Earth. The ionosphere is not static, and as a result, the high frequency (HF) channel (i.e., 3-30 MHz) may undergo short, medium, and long-term variations. Due to these variations, it is often challenging to use the HF channel as a communication medium.

Short-term time variations in the HF channel may arise from fading (time varying) multipath propagation. Ionospheric multipath may cause time dispersion of the order of 2-6 ms, and frequency dispersion, which may manifest as fading, in the range of 1-5 Hz. Multipath may be caused by the reflected rays taking different paths through the ionosphere. Fading may be caused by turbulence in the ionospheric layers.

Medium-term variations in the HF channel may be caused by diurnal changes in the heights and transmission characteristics of the ionospheric layers. The changes may be caused by changing solar radiation-greater radiation during the day increases ionization. The heights and ionization levels of the layers may determine the MUF or maximum frequencies that may support reflection. A slightly lower frequency (e.g., OWF) may be used as the practical upper bound for a given communication range, with the availability of the frequency being guaranteed for 90% of days.

In addition to time and frequency dispersion, the HF channel may experience severe congestion in many parts of the world, especially at night, with many users contending for the same frequency band. There are several reasons for this HF band congestion. In most other bands, the mean propagation characteristics (measured by pathloss) are more predictable. This enables frequency spectrum to be allocated to individual users/operators, and to be enforced by regulators. However, at high frequency, for a given geographic region, the propagation characteristics may change drastically with time of day, season, and year in the sunspot cycle. This makes managing enforceable frequency spectrum allocations difficult. The International Telecommunication Union (ITU) standards subdivide the high frequency band into allocations by user type (e.g., fixed, mobile, aeronautical, etc.) to keep similar types of users in common subbands. However, there is no 'allocation' of a subband exclusively to one operator, as in cellular systems. Users in a common subband contend for spectrum based on transmit power and protocol power efficiency. Consequently, it is difficult to distinguish an interfering signal originating from few hundred kilometers away from an interfering signal originating from thousands of kilometers away.

HF band congestion may be exacerbated by the fact that, at night, the OWF (for a given range) reduces to a fraction of its value by day. For example, the HF spectrum occupancy, observed through a 1 kHz measurement bandwidth, may shrink from 30 MHz and above during the day to under approximately 15 MHz at night. See e.g., Gott, G. F., Dutta, S. and Doany, P., "*HF Interference with application to digital communications*", IEE Proceedings, Vol. 130, Pt. F, No. 5, August 1983, the contents of which are incorporated herein by reference for all purposes.

For voice and data communication, the HF channel has traditionally been channelized in 3 kHz standard allocations by the ITU. For an optimal waveform design, as is provided by the various embodiments, it is useful to understand the spectral characteristics of other user interference inside the allocated 3 kHz band, measured with a spectral resolution that is substantially finer than 3 kHz.

Research into HF spectrum occupancy has influenced the choice of occupancy definitions. University of Manchester Institute of Science and Technology (UMIST) has used 100 Hz resolution, or measurement bandwidth, to characterize spectrum occupancy inside a 3 kHz window, which may be referred to herein as "fine spectrum occupancy." In contrast, spectrum occupancy measured with a 3 kHz measurement bandwidth may be referred to as "coarse spectrum occupancy." The latter term may also be used for spectrum occupancy measured with 1 kHz measurement bandwidth (statistically, there is not much difference between the two parameters).

Research into fine spectrum occupancy has revealed the following salient characteristics. See e.g., Gott, G. F., Dutta, S. and Doany, P., "HF Interference with application to digital communications", IEE Proceedings, Vol. 130, Pt. F, No. 5, August 1983; S. Dutta and Gott, G. F., "Correlation of HF interference spectra with range", IEE Proceedings, Vol. 128, Pt. F, No. 4, August 1981; Gott, G. F., Wong, N. F., and S. Dutta, "Occupancy Measurements across the entire HF Spectrum," Propagation Aspects Of Frequency Sharing Interference And System Diversity, ed. H. Soicher, March 1983; Stehle, R. H., and Hagn, G. H., "HF channel occupancy and band congestion: The other-user interference problem", Radio Science, Volume 26, No. 4, pp 959-970, August 1991; and Gott, G. F. and Green, P. R., "The Measurement And Modelling Of Hf Spectral Occupancy Over Northern Europe Using A Monopole Antenna, 1990-2001", University of Manchester report, August 2007, the contents all of which is incorporated herein by reference for all purposes. Fine spectrum occupancy may be non-uniform within a 3 kHz and 1 kHz band (i.e., the interference may be predominantly narrowband relative to a 1 kHz or 3 kHz window). When other users are absent, the background noise floor may be determined based on atmospheric noise, which is spectrally white over 50 kHz (with a slow, downward frequency gradient over the HF band).

Examples of 50 kHz segments of the HF band recorded in England in 1980 during midnight and midday show that, at midnight, when the voiceband (3 kHz bandwidth) availability of the band, sliced 10 dB above the atmospheric noise floor, is close to zero, the Availability of 100 Hz subbands is nearly 50% (Congestion is 0.58). See e.g., Gott, G. F., Dutta, S. and Doany, P., "*HF Interference with application to digital communications*", IEE Proceedings, Vol. 130, Pt. F, No. 5, August 1983, the contents of which are incorporated herein by reference for all purposes. In contrast, during midday, the Congestion is only 0.17 with the availability being defined as (1—Congestion). In congested conditions, other-user interference may be narrowband relative to a 1 or 3 kHz spectral window.

The above observations have motivated the waveform designs of many of the present embodiments. They offer an opportunity for shaping the transmit waveform's spectrum to avoid the peaks of the interference power spectral density at the receiver.

Research has also revealed the following additional characteristics of HF interference, which are also relevant to the design of the waveforms and protocols of the various embodiments. The spectrum occupancy may be time stationary over minutes-sometimes hours. See e.g., S. Dutta and Gott, G. F., "Correlation of HF interference spectra with range", IEE Proceedings, Vol. 128, Pt. F, No. 4, August 1981, the contents of which is incorporated herein by reference for all purposes. Further, the spectrum occupancy may be spatially correlated with distance over several hundred kilometers. While the former stems from the usage patterns of HF users, the latter arises from the Earth-ionosphere geometry. See id.

As background, the earliest forms of HF communications included Morse code and single sideband (SSB) analog voice, in addition to short wave amplitude modulation (AM) broadcasting. HF communications usage progressed to low rate (75 bps) frequency-shift keying (FSK) transmission in a 3 kHz channel for connecting teletype terminals. For analog transmission, coping with channel fading was limited to selecting a frequency close to the OWF, which typically encountered less time dispersion than at lower frequencies, and using time/frequency diversity techniques. However, competition for near-OWF frequencies may be severe, and to avoid congestion, a suboptimal lower frequency was often used.

Historically, more spectrally efficient, multiple-tone (also referred to as 'parallel tone', or simply 'parallel') modems were developed. One known parallel modem was Kinneplex, referred to in the US military as Link-11. The waveform structure was multicarrier, orthogonal frequency division multiplexed (OFDM), differential quaternary phase-shift-keying (DQPSK), assisted by a 605 Hz Doppler correction pilot tone. The use of multicarrier OFDM provided a quantum leap increase in the spectral efficiency of the link over conventional solutions at the time, creating one of the first instances of 2.4 kbps data transmission over 3 kHz bandwidth at HF. The option existed to double the occupied bandwidth using double sideband suppressed carrier (DSB/SC) modulation at the transmitter (transmitting the same information in the lower sideband (LSB) and upper sideband (USB)), and independent sideband (ISB) demodulation at the receiver with frequency diversity combining. This mitigated frequency selective fading, which is typical on HF channels with 3 kHz frequency bandwidth.

Research has demonstrated the potential for link optimization by adapting to the fine structure of HF interference spectrum. However, as described below, no wideband HF data modem has yet been proposed that adapts to the fine structure of interference spectrum occupancy. Some solutions have developed several narrowband, relatively low data rate HF communication systems (transmitting 75 bps over 3 kHz bandwidth channels), exploiting the fine structure of HF spectrum occupancy. However, none of these solutions adapted the waveforms and protocols of an HF communication system to interference spectrum occupancy for channel bandwidths substantially greater than 3 kHz and data rates in the order of hundreds of kbps. As explained in more detail below, occupancy statistics indicate that such adaptation may reduce the transmit power of a WBHF link by approximately 20 dB.

It should be apparent to those skilled in the art that, when the bearer data rate is of the order of hundreds of kbps, as mentioned above, applications other than data communication may be feasible, such as digitized voice and compressed video. Therefore, the reference to "data packets" should be interpreted as packets of bearer channel data, not application layer data.

Coarse HF spectrum occupancy recorded in England circa 1980 has shown congestion for different measurement bandwidths and interference power slicing thresholds. See e.g., Gott, G. F., Wong, N. F., and S. Dutta, "Occupancy Measurements across the entire HF Spectrum," Propagation Aspects Of Frequency Sharing Interference And System Diversity, ed. H. Soicher, March 1983 and Gott, G. F. and Green, P. R., "The Measurement And Modelling Of Hf Spectral Occupancy Over Northern Europe Using A Monopole Antenna, 1990-2001", University of Manchester report, August 2007, the contents of both are incorporated herein by reference for all purposes. It was observed that changing the congestion of a 3 kHz channel from 99% to 45% required changing the interference threshold by 20 dB (between −107 dBm and −87 dBm), which may require changing the transmit power by 20 dB. In some instance, by using the methods taught here, in which it were possible to operate in a 99% congested environment with the same packet error rate as in a 45% congested environment, 20 dB of transmit power saving may accrue. Analysis of the fine structure of the interference showed that, when the band is close to 100% occupied when viewed through a 3 kHz window, it is often only 50% occupied when viewed through a 100 Hz window. The various embodiments disclosed herein implement interference-adaptive methods to realize this potential for improved power efficiency, which may be exchanged for greater throughput for a given transmit power.

More recently, HF modem technology has moved away from the parallel modems like Link-11 to single tone modems exemplified by MIL-STD-188-110C which, instead of transmitting data in separate parallel streams on multiple narrowband subcarriers, transmitted them serially on a single, wider bandwidth carrier. Hence, they are also referred to as serial modems. MIL-STD-188-110C represents the present state of the art of present wideband HF (WBHF) data communication systems.

In WBHF, adaptive equalization may be used to combat time and frequency dispersion. The apparent motivation for this shift away from parallel modems (such as Link-11) was that parallel tones create a high peak to average power ratio (PAPR) in the composite waveform, which is much less for a serial modem. However, the PAPR difference between a quadrature amplitude modulation (QAM) serial modem and a parallel modem with many tones is expected to be only of the order of 6 dB, citing the difference between single frequency FDM (DFT-S-OFDM) and CP-OFDM among 3GPP cellular waveforms. Further, the state of the art of digital signal processors enabled realization of sophisticated channel equalizers, providing additional incentive for realizing serial modems, which were not previously feasible. Conspicuous by its absence in the "problem statement for HF modems" was any recognition of the non-white nature of interference from other users.

Some embodiments disclosed herein may include components (e.g., WBHF modems, etc.) configured to optimize the HF communication link for both time-frequency dispersion and non-white interference.

Some embodiments disclosed herein may include components that are configured to implement a new WBHF communication system with Interference Avoidance (Enhanced WBHF, or E-WBHF). For brevity and to focus the discussion on the most important features, certain core principles implemented by the various embodiments are explained through an example design. This example design is sometimes referred to as a 'preferred embodiment'. However, other designs may be used to implement the core principles. As such, nothing in this application should be used to limit the scope of the claims to the example design or preferred embodiment unless expressly recited as such in the claims.

The E-WBHF modem may preserve the upper layers of the above-described standard as much as possible, and substantially improve the power efficiency of the waveform by dynamically adapting the spectrum of the transmitted waveform to the spectral density of other user interference at the receiver. In some embodiments, the sum of the desired signal and interference spectral densities at the receiver may be a constant.

In the various embodiments, the E-WBHF modem may include the attributes described below.

Waveform

In the preferred embodiment, the waveform used is OFDM, although non-orthogonal FDM may also be used in alternate embodiments. The orthogonality of the FDM subcarriers in OFDM may not be material in some embodiments. In some embodiments, E-WBHF may selectively suppress certain OFDM subcarriers, including none, to adapt the transmitted waveform's spectrum to the fine spectrum occupancy at the receiver. In some embodiments, fine spectrum occupancy may be defined to have a measurement bandwidth of 110 Hz, and coarse spectrum occupancy to have a measurement bandwidth of 3 kHz.

All subcarriers may be located in frequency on a common raster with 110 Hz spacing. Suppressing subcarriers at the transmitter may save transmitter power, which may be applied to transmitted subcarriers that have not been suppressed, thereby keeping the mean transmitted power substantially constant regardless of the number of subcarriers transmitted. In certain modes of operation, such as unicast (point to point transmission), some of the subcarriers in the transmitted signal may be suppressed. In other modes, such as broadcast or multicast (referred to generally as 'broadcast' in this disclosure) all subcarriers may be transmitted.

FIG. 1 illustrates a preferred embodiment that uses a multicarrier OFDM waveform 100. In the example illustrated in FIG. 1, there are three hundred and sixty four (364) subcarriers (SCs) situated on the above frequency raster, with a numerology described below. The subcarriers, shown with solid outlines 102, are transmitted, while subcarriers with dotted outlines 104 are suppressed (not transmitted), responsive to a determination by the system that, at the intended receiver location, the spectra corresponding to subcarriers 104 are occupied by excessive interference.

The waveform has a nominal channel bandwidth of 40.04 kHz and an ITU allocated bandwidth of 48 kHz, corresponding to sixteen 3-kHz standard HF channels. In comparison, the WBHF standard uses eight standard 3-kHz channels, comprising 24 kHz. The spectrum allocation to the present embodiment of E-WBHF may be doubled because, in highly congested bands, the availability of a 110 Hz subband is about 0.5.

Although, as described above, the fine spectrum occupancy may be measured with 100 Hz measurement bandwidth, the preferred embodiment may use 110 Hz for the same metric to fit the numerology of its OFDM waveform design. This minor difference may not have a significant impact on the measured spectrum occupancy characteristics. Further, small deviations from 110 Hz or 100 Hz, in the choice of the measurement bandwidth for fine spectrum occupancy, do not reduce, negate, or invalidate the benefits provided by the various embodiments.

The key parameter defining "narrowband interference", in the context of the present application, and thereby fine versus coarse spectrum occupancy, is the ratio of the measurement bandwidths used for fine and course spectrum occupancy. The ratio of 3 kHz and 100 Hz is 30. The use of any ratio above 10, corresponding to 300 Hz in a 3 kHz allocation, could also derive benefits from the various embodiments.

Various embodiments described herein assume that the 16 standard (3 kHz) channels are adjacent and contiguous. Other embodiments may carrier-aggregate non-contiguous standard HF channels by converting each to complex baseband, using a parallel multi-channel tuner, and placing them adjacent to each other to create an objective spectrum plan.

The preferred embodiment may use non-contiguous carrier aggregation, which may offer the advantage of pre-selecting less congested standard channels to synthesize the objective waveform. As an example, the standard 3-kHz bandwidth channel (elementary channel) may be in a congested part of the HF band at night. Accordingly, the elementary channels may be selectively placed in the HF band to avoid the peaks of the coarse spectrum occupancy (measured with 3 kHz bandwidth). Such placements are necessarily non-contiguous, and in the above example, may yield 24 kHz of relatively less congested spectrum. In some embodiments, the less congested spectrum may be processed to further improve or maximize spectrum utilization through the methods taught here to exploit non-uniform, interference power spectral density.

During day-time, most of the spectrum may have little interference. As such, selective placement of the elementary channel may be redundant. Invoking elementary channel preselection may be an implementation choice.

Waveform Numerology

In OFDM, the following parameters are referred to as the 'numerology' of the waveform. Provided below is the numerology of the preferred embodiment. They are informed by the numerology of Link-11, and have been proven suitable for use in the HF channel.

Frame length (symbol period+CP): 13.33 ms
Symbol period: [9.09 ms]
Cyclic Prefix (CP): [4.24 ms]
Subcarrier spacing 110 Hz. Depending on the spectrum occupancy at the receiver, not all subcarriers are transmitted—some are suppressed at the transmitter.

This waveform may transmit data on each subcarrier at (1/9.09E-3=75 symbols/s). The net throughput may be the aggregate of the data on all subcarriers. The inverse relation between the symbol period of 9.09 ms and subcarrier spacing of 110 Hz may ensure orthogonality between the subcarriers. Such a requirement may not exist for non-orthogonal frequency division multiplexing, which may be used in some embodiments.

For a given transmit power and pathloss, based on the signal-to-noise-and-interference power ratio (SNIR) in the subcarrier bandwidth at the receiver, different throughput rates may be achieved by using different modulation and coding schemes, collectively referred to as 'MODCODE'. While it may be preferable to select clear subchannels (limited only by atmospheric noise), in highly congested bands, subchannels with limited amounts of interference power may also be utilized. The exchange of spectrum occupancy data among the nodes, referred to as spectrum usability mask (SUM), may enable the use of optimal transmit power and MODCODE on each subcarrier, responsive to the interference spectral density in the subcarrier spectrum at the location of the receiver. In some embodiments, these resource choices may be made by a resource manager in the transmitter. In some embodiments, the resource management scheme may be customized to specific missions and implementation.

Modulation and Coding

In the preferred embodiment, different MODCODEs may be used in different operational modes, which include user data unicast, user data broadcast and SUM data broadcast.

To reuse existing technologies, in the unicast mode, forward error correction (FEC) coding and the modulations may be preserved relative to the legacy WBHF standard. The modulation may be coherent, quadrature amplitude modulation (QAM), including the multiple phase shift keying (MPSK), further including binary phase-shift keying (BPSK) and quadrature phase-shift keying (QPSK). Maintenance of phase coherence at the receiver may be assisted by embedded, time multiplexed, pilot symbols. A balance may be maintained between user plane capacity and the efficacy of mitigating time and frequency dispersion of the channel by optimally apportioning power to pilot and traffic signals.

The FEC scheme for unicast transmission may be similar to WBHF (rate-1/2, k=7 and k=9, tail-biting, punctured convolutional code). However, two major differences may be introduced in E-WBHF relative to WBHF.

First, erasure detection may be used in the convolutional decoder, which may improve performance relative to erroneous symbols being input to the decoder. Erasures may be declared at the receiver when a subcarrier's frequency is observed to contain excessive interference, the observation being made through fine spectrum analysis of the received signal during periods of radio silence enforced by the protocol.

Second, a fountain code may be used to share spectrum usability mask (SUM) data with other nodes in the network. As explained in more detail below, a fountain code may assure, with very high confidence, that all nodes have error free copies of the SUM data of every node of the network. This may be a foundational requirement. The SUM data may represent a quantized version of the fine spectrum occupancy at the receiver location.

An advantage of using a fountain code to distribute SUM data is that the latter changes very slowly with time, and the reliability of a fountain code to transport a finite data block, or file, goes up exponentially with time. This may not be true of more common FEC codes transporting streaming (endless) data.

In the preferred embodiment, in addition to usage for exchanging SUM data, the fountain code may also be used for long-range broadcast traffic, where the receivers are at a distance greater than a minimum limit, such as 300 km, beyond which range the interference spectrum occupancy is typically uncorrelated. The transmission scheme for broadcast traffic may be changed relative to unicast traffic because, in long range broadcast, the transmit spectrum may not be shaped to fit a single objective mold, given that the interference spectrum occupancy is not guaranteed to be correlated at all receiver locations. However, for broadcast traffic networks under 300 km range, transmit waveform spectrum shaping fitted to the interference spectrum received at the transmitter may be used because of the high likelihood of correlated interference spectra at the transmitter and receiver. This may be of considerable benefit to short-range (both surface wave and high-angle skywave) HF links, which are often used in military missions. For exchanging SUM data in networks where the maximum range is approximately 300 km, transmit waveform spectrum shaping fitted to the interference spectrum received at the transmitter may also be used, as discussed above for broad Where knowledge of interference spectrum occupancy at the receiver is not available to the transmitter, a fountain code may offer an alternate method, based on coding rather than physical layer changes, of adapting to unknown narrowband interference at the receiver. Additional details of applying fountain codes in accordance with various embodiments are provided further below.

Interleaving

Block interleaving may be used to achieve frequency and time diversity, optimally matched to HF channel characteristics related to both interference and fading. It should be understood that the design example provided herein is exemplary, not mandatory, towards implementing the various embodiments.

In the preferred embodiment illustrated in FIGS. 2 and 3, there are 364 subcarrier frequencies, occupying a total of 364×110=40,040 Hz. Each cell of the interleaving block (IL Block) may contain a symbol, which may be a digital word representing the complex amplitude of the signal in each 13.33 ms epoch. For example, in instances in which 64 QAM was selected in the MODCODE scheme, the word would have 6 bits, excluding any error detection and correction bits. A total of up to 364 symbols may be transmitted simultaneously in each epoch—fewer symbols are transmitted in instances in which certain subcarriers are suppressed to avoid narrowband interference at the receiver.

FIG. 2 identifies the subcarrier (SC) (represented by a cell of the IL Block) by an identification (ID) number, which ranges from SC-1 to SC-364. FIG. 3 identifies the subcarrier by its transmission frequency, referenced to the left (lower frequency) edge of the nominal (40.040 kHz bandwidth) channel. The left edge of the first subcarrier is designated 0 Hz. In FIGS. 2 and 3, 364 parallel tones, or subcarriers, are shown, occupying a total bandwidth of 40,040 Hz.

FIG. 4 illustrates that, out of the 364 subcarriers, two sets of 13 subcarriers (batch 1 and batch 2 shown shaded) may be dedicated to broadcasting the receiver's SUM data-they make up the SUM channels.

Figure 5:
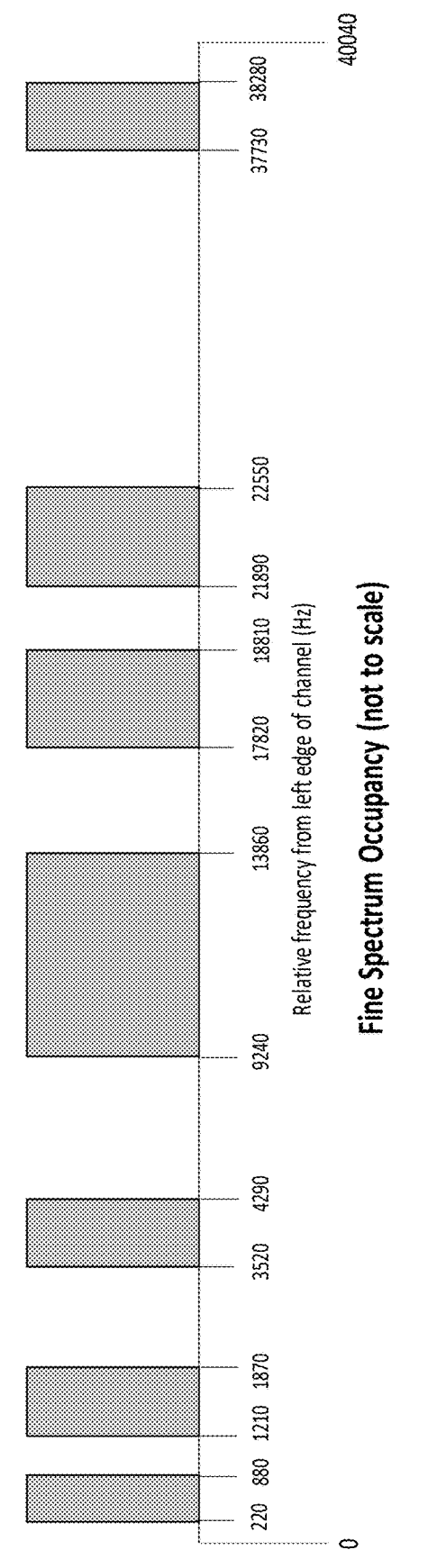
FIG. 5 is a component diagram that illustrates an example of subcarrier suppression, responsive to the fine spectrum occupancy at the receiver, and a frequency domain representation of the occupied spectrum.

FIG. 5 illustrates an example of subcarrier suppression, responsive to the fine spectrum occupancy at the receiver, the suppressed subcarriers being shaded; a frequency domain representation of the occupied spectrum is also depicted. Because the interference is narrowband, the shaded subcarriers are clustered.

Figure 6:
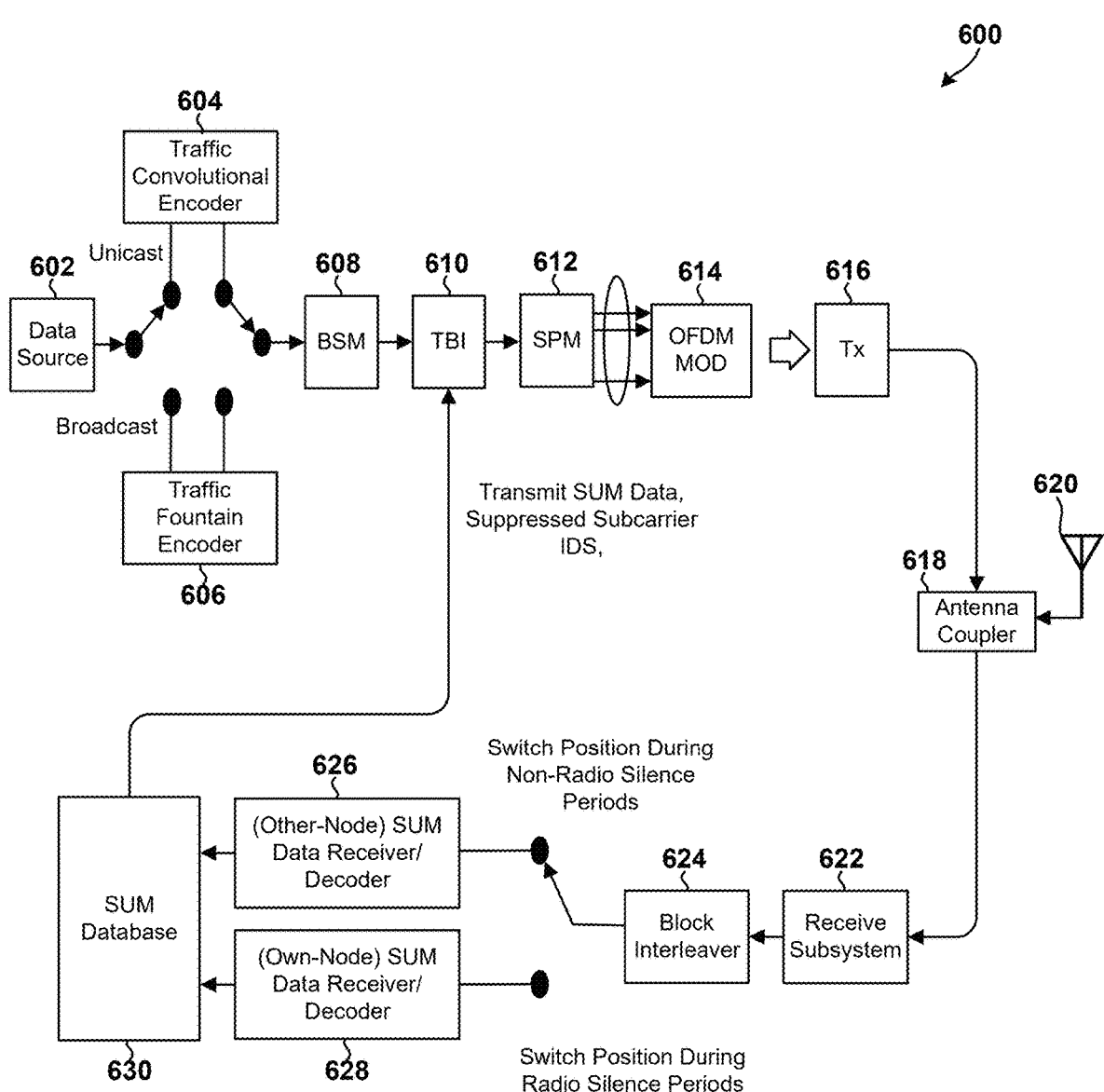
FIG. 6 is a component block diagram that illustrates an example communication device in the form of an E-wideband high frequency (WBHF) transmitter that could be configured to implement some embodiments.

FIG. 6 illustrates an example communication device in the form of an E-WBHF transmitter 600 that could be configured to implement some embodiments. In the example illustrated in FIG. 6, the E-WBHF transmitter 600 includes a data source 602, a traffic convolutional encoder 604, a traffic fountain encoder 606, a bit-to-serial mapper 608, a transmit block interleaver 610, a serial to parallel mapper 612, an OFDM modulator 614, a transmitter 616, an antenna coupler 618, an antenna 620, a receive subsystem 622, a receive block interleaver 624, SUM data receivers/decoders 626, 628, and a SUM database 630. FIG. 6 is described in more detail further below.

Figure 7:
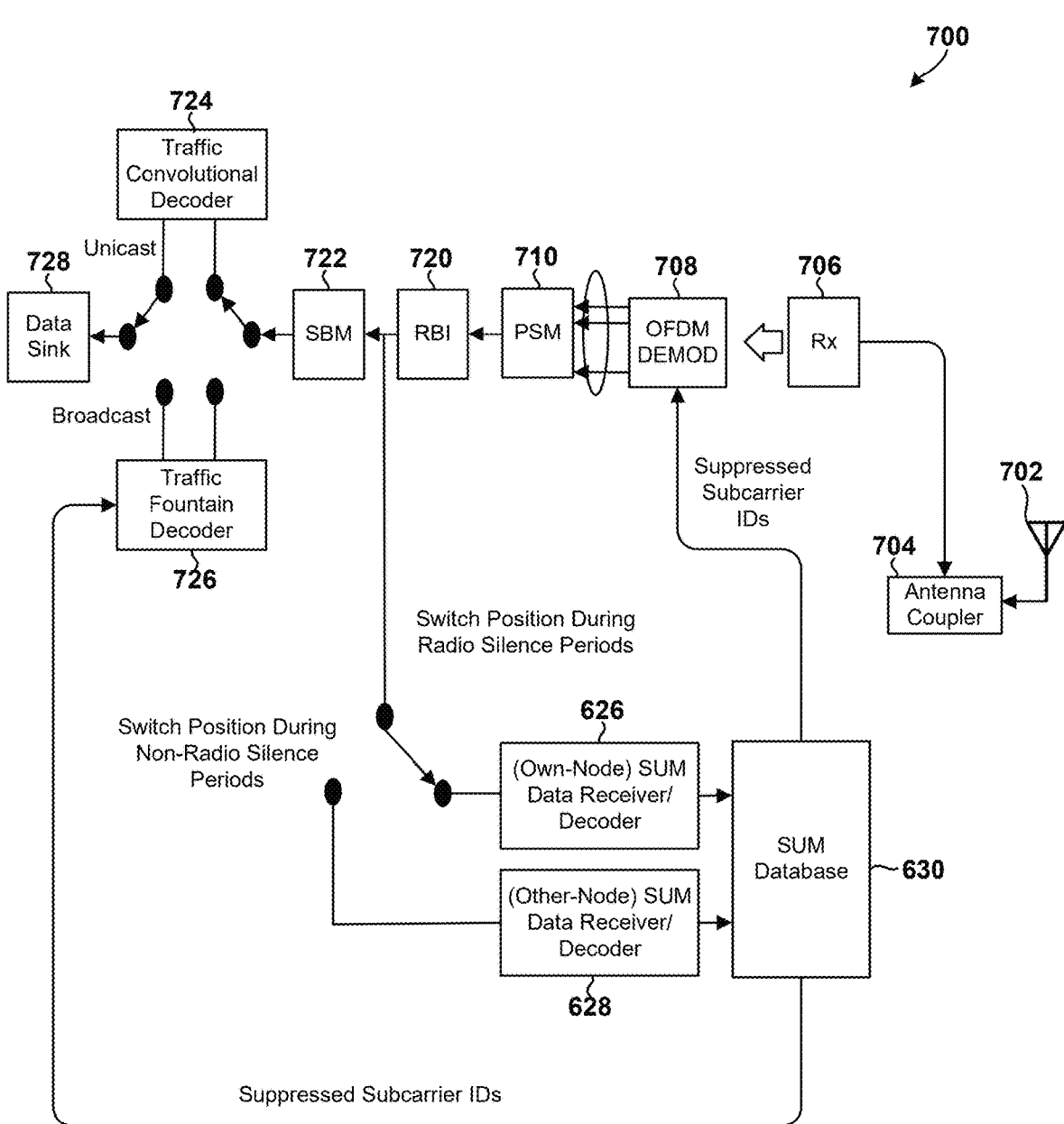
FIG. 7 is a component block diagram that illustrates an example communication device in the form of an E-WBHF receiver that could be configured to implement some embodiments.

FIG. 7 illustrates an example communication device in the form of an E-WBHF receiver 700 that could be configured to implement some embodiments. In the example illustrated in FIG. 7, the E-WBHF receiver 700 includes an antenna 702, an antenna coupler 704, a receiver 706, an OFDM demodulator 708, parallel to serial mapper 710, receive block interleaver 720, symbol to bit mapper 722, traffic convolutional decoder 724, traffic fountain decoder 726, data sink 728, SUM data receivers/decoders (626, 628), and a SUM database 630. FIG. 7 is described in more detail further below.

Figure 8:
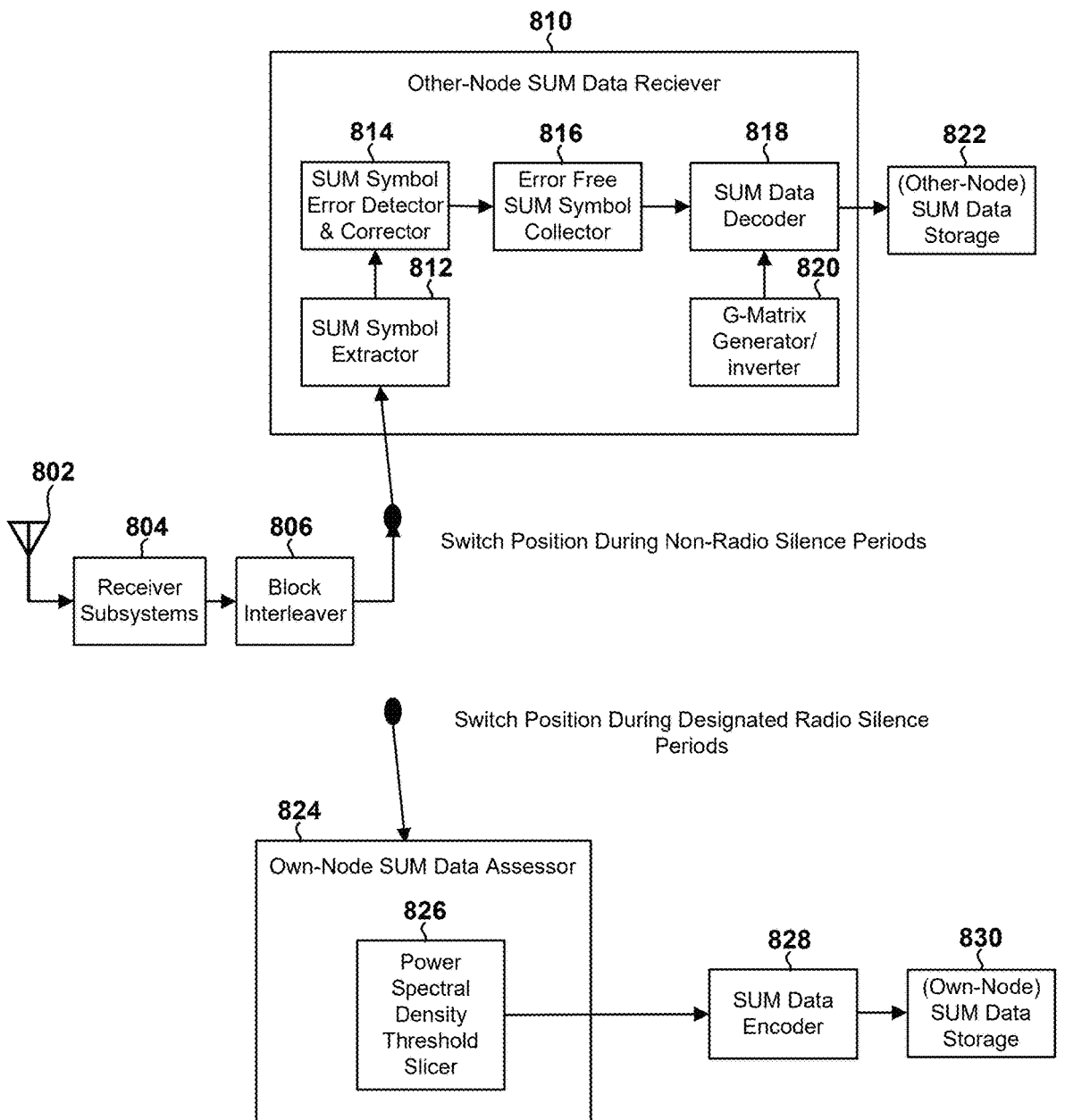
FIG. 8 is a component block diagram that illustrates an example sub-system of a E-WBHF receiver for receiving and assessing SUM data.

FIG. 8 illustrates an example sub-system of a E-WBHF receiver that includes an antenna 802, receiver subsystems 804, block interleaver 806, other-node SUM data receiver 810, a SUM symbol extractor 812, SUM symbol error detector and corrector 814, error free SUM symbol collector 816, SUM data decoder 818, G-matrix Generator and Inverter 820, other-node SUM data storage, own-node SUM data assessor 824 that includes a power spectral density threshold slicer 826, SUM data encoder 828, and own-node SUM data storage 830.

FIG. 9 illustrates an example of a [G] matrix that could be generated (e.g. by the G-matrix Generator and Inverter 820) in some embodiments.

Figure 10:
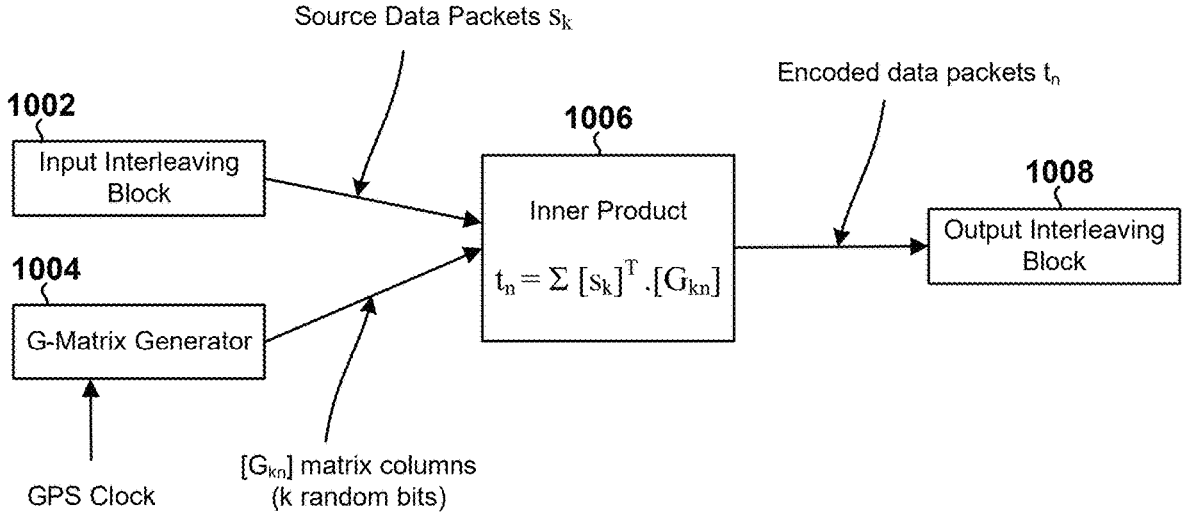
FIGS. 10 and 11 are component block diagrams that illustrate random linear fountain code blocks in accordance with some embodiments.

FIG. 10 illustrates a random linear fountain code encoder block 1000, which includes an input interleaving block 1002, a G-matrix generator 1004, an inner product 1006 and an output interleaving block 1008.

Figure 11:
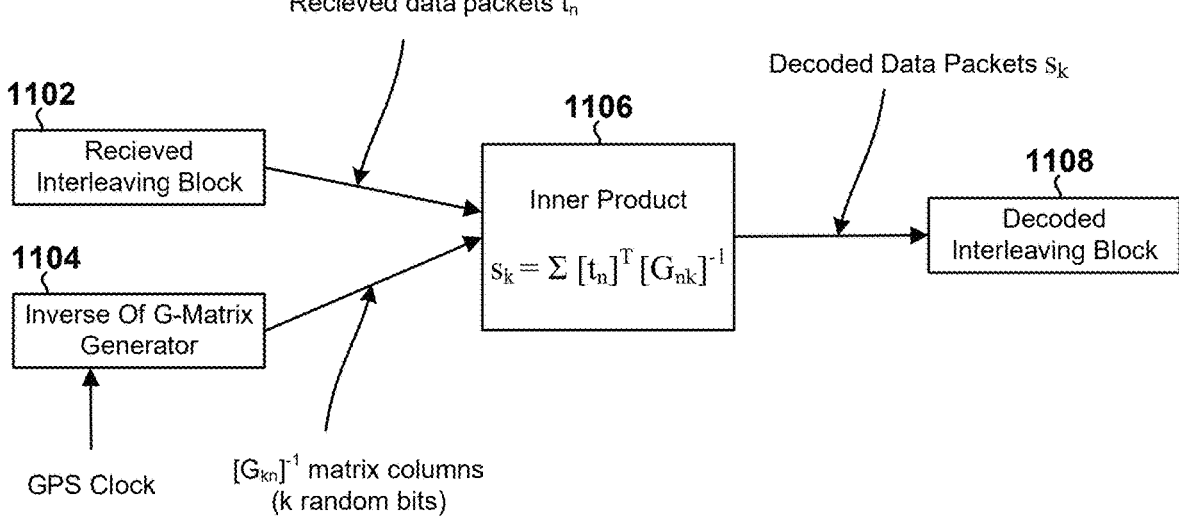

FIG. 11 illustrates a random linear fountain code decoder block 1100, which includes a received interleaving block 1102, an inverse of G-matrix generator 1104, an inner product 1106 and decoded interleaving block 1108.

With reference to FIGS. 2-11, symbols received time-sequentially from the data source 602 may be read into an interleaving block (IL Block) by columns and read out to the rest of the transmit chain by rows (i.e., symbols in a row are sent in adjacent time slots). As shown in FIGS. 2 and 3, time-adjacent symbols (e.g. SC-1, SC-15, SC-29, etc.) are mutually offset in frequency by 1540 Hz. This means that, at the input to the convolutional decoder (e.g., traffic convolutional decoder 724 illustrated in FIG. 7) in the receiver, where the received symbols are read out by rows from an identical block interleaver, the demodulated symbols would have been carried on subcarriers separated by approximately 1540 Hz. This frequency offset is desirable both in terms of the correlation statistics of fine spectrum occupancy and the coherence bandwidth of the HF channel, which is typically under 850 Hz. See e.g., Gott, G. F., Dutta, S. and Doany, P., "HF Interference with application to digital communications", IEE Proceedings, Vol. 130, Pt. F, No. 5, August 1983. As such, this scheme may reduce or minimize the probability of burst errors at the input to the convolutional decoder caused by either interference or fading, which is desirable, as a convolutional decoder is vulnerable to burst errors.

Spectrum Usability Mask (SUM) Generation, Use and Distribution

The fine spectrum occupancy of the HF band, measured in a 110 Hz bandwidth, may be determined at the location of each node by spectrum analysis. In some embodiments, this may be performed by computing the discrete Fourier transform (DFT) or Fast Fourier Transform (FFT) which, further, may be incorporated as a part of an OFDM demodulator (e.g., OFDM demodulator 708 illustrated in FIG. 7). It may then be quantized into a limited number of quantum levels, such as the following: below −125 dBm, between −125 and −115 dBm, between −115 and −105 dBm, and above −105 dBm. The quantum levels may be identified by a data word fitting the number of quantum levels—in the above example, the four quantum levels may require a 2-bit word. Other numbers of quantum levels could be used in the various embodiments.

The communication protocol used in the preferred embodiment may include periods of radio silence that are synchronized among all nodes of the network. In some embodiments, the synchronization may be achieved by GPS time. In alternate embodiments, the system time may be distributed among the nodes of the network by a master node broadcasting a timing reference signal to all nodes. In military applications, GPS-based time synchronization has the advantage of reducing the interception probability of the network.

During radio silence, each receiver may measure the fine spectrum occupancy over a predetermined averaging period. Based on available spectrum occupancy statistics, a suitable averaging scheme may include the following: 1s averaging, performed every 30s, and the averaged samples further averaged over a 5-minute sliding time window. HF fine spectrum occupancy may be highly correlated over well in excess of 5-minute periods.

In the preferred embodiment illustrated in FIGS. 2 and 3, 364 parallel tones, or subcarriers, are shown, occupying a total bandwidth of 40,040 Hz. Out of these 364 subcarriers, two sets of 13 subcarriers (batch 1 and batch 2), shown shaded in FIG. 4, may be dedicated to broadcasting the receiver's SUM data-they make up the SUM channels. The two batches of SUM channels may be transmitted in alternating interleaving block transmissions and offset with respect to each other by 1540 Hz. The purpose of the offset is to introduce additional frequency diversity to improve avoidance of narrowband interference. It should be noted that the SUM channels may have low capacity. As shown below in Table 1, 1.5 s may be required to send the entire SUM data from one interleaving block, during which period, symbols from 113 interleaving blocks may be transmitted. This low SUM channel capacity (975 bps) is acceptable because fine spectrum occupancy changes very slowly, and therefore does not require rapid sampling.

When in an idle mode, each node may have a reserved, radio silence time, synchronized to GPS disciplined Universal Time, during which it collects SUM data. No node may transmit during this time. How the SUM data is distributed to the other nodes depends on whether the radio node is in idle, unicast or broadcast mode. In the unicast mode, the SUM data may be sent on the designated SUM channels, embedded among traffic carrying subchannels, as shown in FIG. 4. Some subchannels, whether carrying SUM data or traffic, may be suppressed at the transmitter and/or erased at the receiver, as shown in FIG. 5. In the broadcast mode, all SUM subchannels may be transmitted. This is because the fine spectrum occupancy of some receivers (at ranges in excess of approximately 300 km) may not be known to the transmitter.

The schedule for sending SUM data, relative to the transmission time of the interleaving block, may be unaffected by the transmission mode (idle, unicast or broadcast), except for suppression/erasure of the SUM data subchannels when the subchannels coincide with narrowband interference at the receiver. The SUM data may be sent on 13 parallel channels, each bursting at 75 symbols/s. In the preferred embodiment, the SUM data of the entire 40 kHz (approximately) channel may be transmitted every 15 minutes.

Table 1 shows that, according to the transmission time plan described above, the entire SUM data for a 40 kHz channel may be sent with a random linear fountain code in approximately 4.5s, including 3 repeats. A few more repeats may be required, depending on the congestion in the channel but only a small fraction of the 15-minute SUM data repetition time is consumed.

TABLE 1

| SUM data transmission time-plan | |
| --- | --- |
| Raw SUM bits per SC | 2 |
| Hadmard coded SUM bits per SC | 4 |
| No. of SCs whose SUM data is reported in 1 SUM Packet (contents of 2 columns) | 28 |
| No. of SCs dedicated to SUM data transmission in one IL Block (no. of columns) | 13 |
| Payload of 1 SUM Packet with 1 CRC bit added | 113 bits |
| Total SUM data in 48 kHz bw channel | 1469 bits |
| Capacity available for SUM data transmission | 975 bps |
| Time reqd. to transmit SUM data once | 1.506666667 s |
| Time reqd to transmit IL Block | 0.013333333 s |
| No. IL Block transmissions required to send all SUM data once | 113 |

Applications of Random Linear Fountain Code

Random linear codes may be used in the preferred embodiment for the exchange of SUM data between nodes, and for the transport of user traffic in the broadcast mode.

Use of Random Linear Fountain Code for Exchanging SUM Data

A random linear fountain code may be used in the preferred embodiment to distribute SUM data among the nodes of the E-WBHF network. Other types of fountain codes are known in art, any or all of which may be used in the various embodiments.

The SUM data receivers (e.g., 626 and 628) for own-node and other-node respectively, and the SUM database 630, may also be included in the receiver block diagrams (e.g., FIG. 7, etc.) as they include receive functions.

With reference to FIG. 10, a 'packet' may be defined as SUM data bits carried by 28 subcarriers with adjacent IDs, i.e. subcarriers comprising the contents of two adjacent columns of the interleaving block. Specifically, these groupings may include the columns with the following IDs: (1,2), (3,4), (5,6), (7,8), . . . (25, 26). A K×N generator matrix, [G], may be defined in which each column of [G] is a random sequence of bits—the sequences may be linearly independent between the columns. It is not required that the columns of [G] be orthogonal-being linearly independent suffices.

With reference to FIG. 10, an encoder may form an inner product between the vectors represented by the columns of [G], i.e. $[G_n]$ n=1 to N, and the packets of the interleaving block, $[s_k]$, k=1 to K (number of packets in the data file sought to be transported). Here, n is the index of the encoded packet, $t_n$, and k is the index of the source packet which, in the preferred embodiment, may range from 1 to 13. According to the theory of linear random fountain codes, for highly reliably transport, N needs to exceed K by a modest amount.

The inner product may be calculated by executing the following equation:

$$t_n = \Sigma [s_k]^T \cdot [G_{kn}] \tag{1}$$

where the summation is performed over k=1 to K. Note that $t_n$ is not one data bit but an entire packet of data bits. For example, when transmitting SUM data, the packet contains 113 bits. The process is explained further, as follows.

Referring to FIG. 9, the first column of $[G_{kn}]$, i.e. $[G_{k1}]$ is given by $$[G_{k1}]=[1,1,0,0,1,0,0,1,1,0,1,1,0]^T$$

The vector, $[s_k]$, is depicted below, for different values of k.

$$[s_1]=[SC-1_{SUM\ data}],[SC-2_{SUM\ data}],\ \cdot\ \cdot\ \cdot \\ [SC-28_{SUM\ data}],[CRC]]^T(1^{st}\text{SUM source data} \\ \text{packet})$$

$$[s_2]=[SC-29_{SUM\ data}],[SC-30_{SUM\ data}],\ \cdots\ [SC- \\ 56_{SUM\ data}],[CRC]]^T(2^{nd}\text{SUM source data} \\ \text{packet})$$

$$[s_{13}]=[[SC-337_{SUM\ data}],[SC-338_{SUM\ data}],\ \cdots\ [SC- \\ 364_{SUM\ data}],[CRC]]^T(13^{th}\text{ source SUM data} \\ \text{packet})$$

Each $[SC-i_{SUM\ data}]$ may be a 4-bit word representing the Hadamard coded SUM data for the i-th subcarrier, and [CRC] may represent a single-bit, cyclic redundancy check sum. As shown in Table-1, the dimension of $[s_i]$ is (28×4+1=113) bits. Each 113-bit word may represent one source SUM-data-packet, representing the SUM data of two adjacent columns of the interleaving block, there being 13 such packets in the interleaving block, plus 1 CRC bit. In the fountain coding scheme, each 113 bit packet may be 'atomic'—it is received error free or erased. An erasure may be declared in instances in which the CRC check fails or the location of a SUM channel is known to have interference above a predetermined threshold. For example, SUM channels $s_4$, $s_5$, $s_7$ would be erased among the batch 1 channels, and $s_1$, $s_4$ would be erased among the batch 2 channels. Executing equation (1) may replace each source SUM-data-packet in the interleaving block with an encoded SUM-data-packet. For example, $$t_1=[s_1]+[s_2]+[s_5]+[s_8]+[s_9]+[s_{11}]+[s_{12}](1^{st}\text{ encoded} \\ \text{SUM data packet})$$

$$t_2=[s_1]+[s_2]+[s_4]+[s_5]+[s_6]+[s_9]+[s_{13}](2^{nd}\text{ encoded} \\ \text{SUM data packet})$$

$$t_n=\Sigma[s_i], \text{ where } i \text{ is determined by the } n\text{-}th \text{ column} \\ \text{of}[G_{kn}](n\text{-}th \text{ encoded SUM data packet})$$

Note that n may grow indefinitely beyond K. In the above set of equations, "+" represents bitwise modulo-2 summation.

The encoded packets, $t_n$, may form the output interleaving block 1008 and may be transmitted over the air, following the same rules for subcarrier frequency allocation as in the input interleaving block 1002. All encoded packets may be generated from the same K packets of the source data file. In the present embodiment for SUM data exchange, K has a value of 13. As explained further below, it is expected that receipt of approximately (13+14=27) error free packets, regardless of which packet is received, is sufficient to ensure error free receipt of the entire file. FIG. 11 shows a Fountain code decoder that complements the encoder shown in FIG. 10 and performs the inverse operation.

FIG. 12 illustrates a method 1200 of processing packets in accordance with some embodiments. Method 1200 may be performed by a receiver device or node, which may be a transceiver device that includes an E-WBHF transmitter, receiver, and/or transceiver (e.g., E-WBHF transmitter 600 illustrated in FIG. 6, WBHF receiver 700 illustrated in FIG. 7, etc.).

In block 1202, the receiver device may receive other-node SUM data. In block 1204, the receiver device may determine the subcarriers (SCs) that are to be suppressed and/or the MODCODE for the subcarriers that are to be utilized. In block 1210, the receiver device may create an input interleaving block based on the suppressed subcarriers (from block 1204), SUM data to be shared with other nodes (from the own-node SUM data assessor 1206), and traffic data (from the data sink 1208).

In block 1212, the receiver device may fetch column data from a stored [G] matrix. In block 1214, the receiver device may perform an inner product based on decoded data packets $S_k$ (from block 1210) and the Nth column of the [G] matrix (from block 1212), and generate a fountain code encoded packet.

In block 1216, the receiver device may populate the output interleaving block (e.g., output interleaving block 1008 illustrated in FIG. 10, etc.) based on the fountain code encoded packet. In block 1218, the receiver device may provide the output interleaving block as input to a modulator of a transmitter subsystem (e.g., OFDM modulator 614 illustrated in FIG. 6, etc.).

Figure 13:
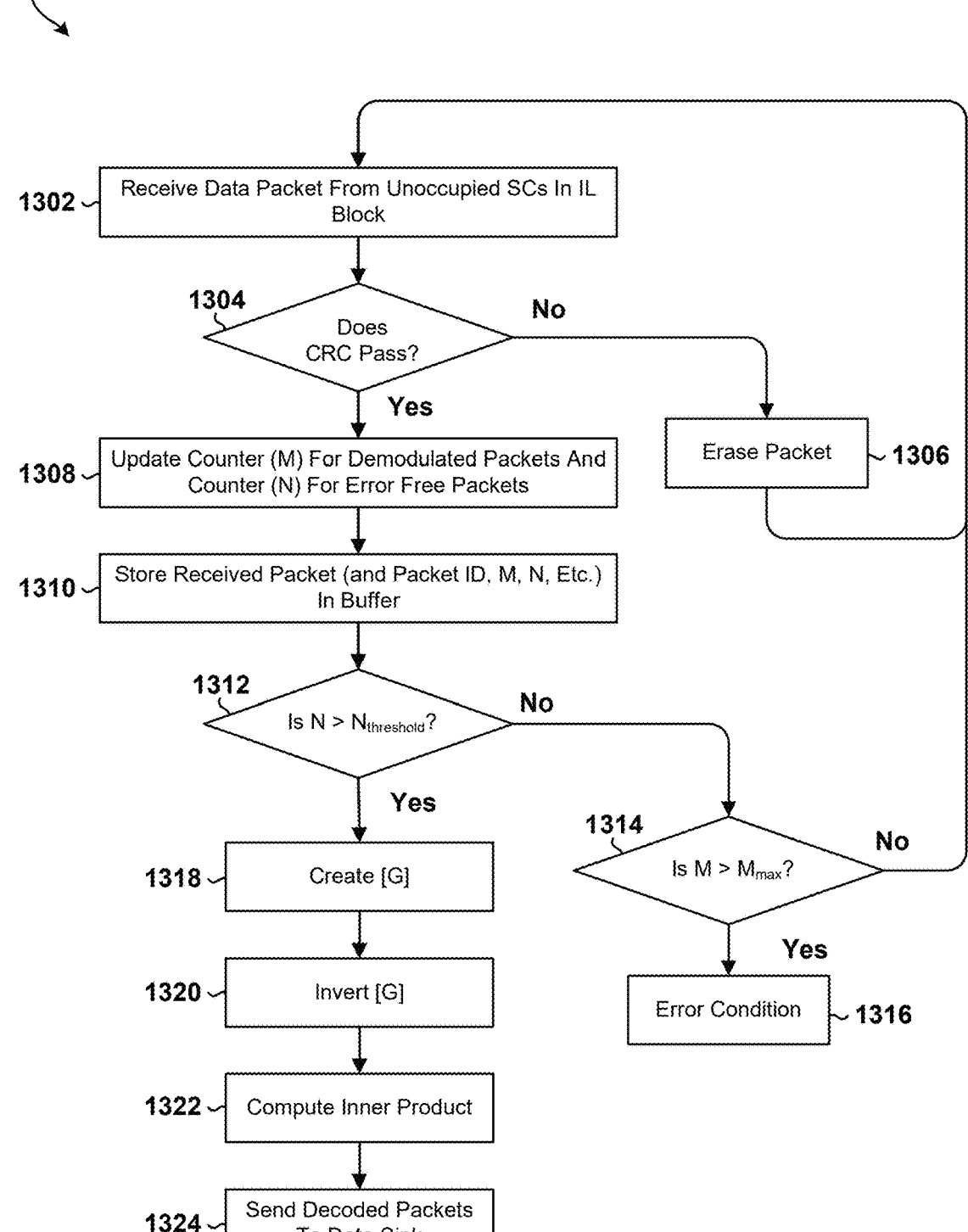
FIG. 13 is a process flow diagram that illustrates a method of processing packets for reception in accordance with some embodiments.

FIG. 13 illustrates a method 1300 of decoding the packets in accordance with some embodiments. Method 1300 may be performed by a receiver device or node, which may be a transceiver device that includes an E-WBHF transmitter, receiver, or transceiver (e.g., E-WBHF transmitter 600 illustrated in FIG. 6, WBHF receiver 700 illustrated in FIG. 7, etc.).

In block 1302, the receiver device may receive a data packet from unoccupied SCs in the interleaving block (IL block). In determination block 1304, the receiver device may determine whether the received data packet passes a cyclic redundancy check (CRC). In response to determining that the received data packet does not pass the CRC (i.e., determination block 1304="No"), the receiver device may erase the data packet in block 1306 and receive another data packet in block 1302. Thus, a received packet may be erased in block 1306 at the receiver based on failing a cyclic redundancy check test on the demodulated packet. Or alternatively, responsive to detecting an uncorrected error in a demodulated data packet, the entire packet is erased from the demodulated data set in block 1306.

In response to determining that the received data packet passed the CRC (i.e., determination block 1304="Yes"), the receiver device may update a first counter (M) for demodulated packets and update a second counter (N) for error free packets in block 1308. That is, in blocks 1304 and 1308, the receiver device may identify packets that are free of errors, keep a first count of the number of packets received, and a second count of the number of packets received error free. In block 1310, the receiver device may store the receive packet (along with its packet ID, the first and second counters, etc.) in a buffer memory.

In determination block 1312, the receiver device may determine whether the value of the second counter (N) exceeds a threshold value ($N_{threshold}$). In response to determining that the value of the second counter (i.e., the count of the number of packets received error free) does not exceed the threshold value (i.e., determination block 1312="No"), the receiver device may determine whether the value of the first counter (M) exceeds a threshold value (e.g., maximum number of decoding attempts, $M_{max}$, etc.) in determination block 1314. In response to determining that the value of the first counter (i.e., the count of the number of packets received) does not exceed the threshold value (i.e., determination block 1314="No"), the receiver device may commence receiving another data packet in block 1302. In response to determining that the value of the first counter exceeds the threshold value (i.e., determination block 1314="Yes"), the receiver device may generate or indicate an error condition in block 1316.

In response to determining that the value of the second counter (i.e., the count of the number of packets received error free) exceeds the threshold value (i.e., determination block 1312="Yes"), the receiver device may generate a [G] matrix in block 1318. In block 1320, the receiver device may invert the [G] matrix. In block 1322, the receiver device may compute the inner product (e.g., by performing $t_n = \Sigma[s_k]^T \cdot [G_{kn}]$, etc.). In block 1324, the receiver device may send the decoded packets ($t_n$) to a data sink (e.g., data sink 728 illustrated in FIG. 7, etc.).

Accurate erasure sensing may be an important aspect of the scheme. In the preferred embodiment, this may be based on two independent conditions, any one of which suffices to trigger an erasure (e.g., in block 1306). First, subcarriers with interference above a threshold are deemed erased-no attempt is made to demodulate symbols received on deemed-occupied subcarriers. Second, subcarriers on deemed-unoccupied subcarriers are demodulated and the CRC check sum is used to verify error free receipt of the packet. Other methods of erasure sensing may be applicable without deviating from the teachings of this invention disclosure.

In block 1310, packets that are received error-free, together with their packet IDs, may be stored in an input packet buffer. The packet ID may be included in the payload of the packet (not incorporated in the preferred embodiment) or inserted at the receiver based on the subcarrier's location in the IL Block. The IL Block ID boundaries (essentially the frame boundaries) may be known from GPS time or discoverable via the link management protocol. A count may be kept of the number, N, of error free packets received. If N exceeds a predetermined threshold value, $N_{threshold}$, which is expected to be sufficient for error-free transport of the entire file as discussed below, then the inner product indicated by equation (2) below may be computed to yield the decoded packets. Note that $[G_{nk}]$ is built with columns which correspond to the IDs of the packets received error free. As such, to construct $[G_{nk}]$, it may be necessary to know the IDs of the packets comprising $[t_n]$.

$$s_k = \Sigma[t_n]^T \cdot [G_{nk}]^{-1} \qquad (2)$$

where the summation is performed over n=1 to N, where N is the number of received error free packets. N must exceed the number of source packets, K by approximately 14 packets to achieve a confidence greater than 0.9999 of recovering the entire file error free.

In some embodiments, to provide a fail-safe exit process, the decoding process may be terminated when a certain maximum number of decoding attempts, $M_{max}$, have been completed. In some embodiments, $M_{max}$ may be fixed by design to ensure that probability of file delivery failure will be below a target value under a very high percentage of operating conditions. A large value of $M_{max}$ may increase the file delivery latency unacceptably. As such, in other embodiments, $M_{max}$ may be self-selected by an intelligent agent in the demodulator based on the latency tolerance of the mission, which would be known to the intelligent agent. The choice of $M_{max}$ would balance file delivery failure probability against the probability of the delivery time exceeding an objective threshold.

Use of Random Linear Fountain Code for Broadcast of Traffic Data

As mentioned above, in the broadcast mode, fine spectrum occupancy may not be identical at all receivers. Therefore, the spectrum of the transmitted waveform generally may not be shaped to optimally avoid interference at the receiver. An exception to this is short range broadcast (e.g., under 300 km, etc.) where there is high likelihood of correlated spectrum occupancy at all receivers. In long range broadcast, spectrum shaping for interference avoidance may not be viable.

Fountain codes may offer an alternate way to make optimal use of spectrum that is partially blocked by narrow-band interference. If some of the packets get through error free, exploiting the spectral gaps in the band, the entire file may be decoded error free with high confidence if the number of received error-free packets exceeds a threshold, $N_{threshold}$, where $N_{threshold}$ marginally exceeds the number of packets in the file.

In the case of traffic broadcast transmission, the encoding and decoding methods and implementation structures may remain the same as described above for SUM data distribution—the block diagrams of FIGS. 11 and 12 apply equally. However, the payloads (or sizes) of the packets may get bigger as user traffic creates more load. A modulation index up to 8 (256 QAM) with 5/6 punctured convolutional coding may be used. This may need at least 8+1=9 bits on average. Adding a CRC bit to enable erasure detection, makes the maximum size of the subcarrier payload to be 9+1=10 bits. This is 10/4=2.5 times the size of the payload when transmitting SUM data (113 bits as shown in Table 1). To improve or maximize the potential of getting individual subcarriers through a congested band, some embodiments may make the packet the same as the subcarrier payload. However, to reduce or minimize the computational load, which may be proportional to the number of packets set per second, it is desirable to increase the packet size, which reduces the probability of error free transmission of the whole packet, and therefore allows for more packet transmissions. Specific embodiments may opt for different tradeoffs between packet size and implementation complexity.

Detailed Description of Transceiver

Transmitter Block Diagram

As mentioned above, FIG. 6 shows a system block diagram of the E-WBHF transmitter 600. This block diagram applies in all operational modes of the network—(i) SUM data exchange, (ii) unicast traffic transmission, and (iii) broadcast traffic transmission.

Data to be transmitted is available from a data source 602, formatted as files containing a finite, known number of packets, K. In the preferred embodiment, K may be 13 for SUM data and application dependent for traffic transmission (but known at the receiver). Depending on whether the traffic transmission is unicast or broadcast, different encoders may be used to encode the data. These encoders are traffic convolutional encoder 604 and traffic fountain encoder 606.

The encoded traffic data may be formatted by a bit-to-serial mapper 608, which may populate the transmit block interleaver 610, where the procedure for placing the traffic or SUM data words, corresponding to QAM symbols, in the cells of the transmit block interleaver 610 is described. The SUM data corresponding to the receiving node may be fetched from the SUM database 630 and placed in the appropriate cells of the transmit block interleaver 610. Some of the subcarriers in the transmit block interleaver 610 may be suppressed, also referred to as erased, based on the transmission mode (e.g., SUM data, unicast or broadcast). Unerased contents of the transmit block interleaver 610 may be read out to a serial to parallel mapper (SPM) 612 and then applied to modulate the tones of an OFDM modulator 614.

As explained previously, in other embodiments, the modulator may be a non-orthogonal FDM modulator.

In some embodiments, the OFDM modulation may be performed by computing an Inverse Discrete Fourier Transform (IDFT) of the contents of the transmit block interleaver 610, read out by rows. The transmit waveform after OFDM modulation may be at an arbitrary baseband frequency of IF, such as complex digital (I/Q), or analog IF, depending on the specific architecture of the embodiment.

The output the OFDM modulator transmit waveform may be upconverted to the desired frequency, or frequencies, in the HF band and transmitted through the antenna coupler 618 and the antenna 620. In embodiments in which carrier aggregation is used, the transmission may be at a plurality of non-contiguous frequencies in parallel. In the latter case, a multichannel, parallel, upconverter is required.

Some functions of the transmitter may be influenced by certain received parameters. Functional blocks involved in the reception and processing of these parameters are described below. Data symbols received through the receive subsystem 622 may be collected in the receive block interleaver 624. During periods of radio silence, the received symbols may be spectrum analyzed to generate the SUM data for the entire operating band, which is 40.04 kHz in the preferred embodiment without carrier aggregation but may be less when carrier aggregation is used. The generation of SUM data during radio silence, and their encoding by a fountain code may be performed in the own-node SUM data generator/fountain-encoder 628.

During periods of non-radio-silence, SUM data sent by other nodes may be collected from the receive block interleaver 624 and demodulated and decoded (using a Fountain Decoder) in block 626.

The SUM data from blocks 626 and 628, representing the SUM data received from other nodes and own node, may be deposited in the SUM database 630, together with the packet IDs identifying each packet. Every node may include a copy of the SUM database 630, which may be continually synchronized through the process of SUM data exchange every 15 minutes when the node is active (ready for transmit or receive).

During unicast or short range broadcast, the SUM data to be transmitted may be fetched from the local SUM database 630. The SUM database 630 may also provide the IDs of the suppressed carriers fed to the transmit block interleaver 610. During long range broadcast transmission, no subcarriers are suppressed. During short range broadcast, the suppressed carrier IDs may be based on own-node SUM data.

Receiver Block Diagram

With reference to FIG. 7, signals received in a 48 KHz segment of the HF band, which may be contiguous or non-contiguous, may be received though an antenna 702 and antenna coupler 704 and fed to a receiver (Rx) 706, which may downconvert the signal to complex baseband or IF for signal processing. In embodiments in which carrier aggregation is used, the downconversion may involve a plurality of parallel downconverters.

The signal may be fed to an OFDM (or FDM) demodulator 708. The OFDM demodulation may be implemented by a Discrete Fourier Transform (DFT), which may recover the complex baseband symbols representing the modulation envelopes of the 364 subcarriers in the present embodiment. The envelopes may be read into the receive block interleaver (RBI) 720 by rows, and read out by columns to a symbol-to-bit-mapper (SBM) 722. The latter may be QAM (including BPSK, QPSK) demodulator that feeds a traffic convolutional decoder 724 in the unicast mode and a traffic fountain decoder 726 in the broadcast mode.

The various embodiments advance the state of the art of wideband HF communication beyond the current art, represented by the WBHF standard, in at least the following major aspects. These aspects do not limit, in any way, the draft claims which relate to additional innovations.

In a first set of embodiments, in a mesh network comprising a plurality of transmitting and receiving nodes in a congested band, the network senses the interference spectrum occupancies at a plurality of receiver nodes and synthesizes transmit waveforms at the transmit nodes so that the spectra of the transmit waveforms fit into the gaps of the interference spectra at the receiver nodes. Further, the transmit waveforms may utilize a substantial part of the unoccupied spectrum at the receiver, to maximize the spectral efficiency of the waveform while also minimizing exposure to the interference spectrum.

The methods of radio communications may also include assessing the interference spectrum occupancy with a measurement bandwidth of approximately 110 Hz, referred to as fine spectrum occupancy. The total spectrum occupancy of the transmitted signal may be substantially greater than 3 kHz.

The methods of radio communications may result in a substantial reduction in the transmit power compared to a system that does not adapt to the fine interference spectral occupancy.

The methods of radio communications, such as designing the transmit signal spectrum to complement the receiver's interference spectral density, may be applied to radiofrequency bands in general and are not limited to HF. Here "complement" means that the sum of the desired signal and interference signal spectra at the receiver are substantially constant).

The band of application in the preferred embodiment is HF, with a channel bandwidth that is substantially greater than the nominal bandwidth of 3 kHz standardized by ITU for a single voice circuit.

The transmit waveform may be synthesized by excising subbands from a composite wideband signal, e.g. 48 kHz bandwidth in the preferred embodiment. The composite wideband signal may include a plurality of standard, 3 KHz voice channels that may be contiguous in some embodiments and discontiguous in alternate embodiments.

In some embodiments, the subband excision may be performed at the transmitter by suppressing subcarriers in an OFDM signal. Alternate methods of narrowband frequency excision may be used, such as excluding individual filters in a non-OFDM filter bank, or inserting bandstop, or notch, filters in a wideband signal.

Spectrum occupancy information may be exchanged among the nodes of the network by quantizing and compressing the information into a Spectrum Usability Mask parameter—SUM data—which may be shared among the nodes.

SUM data may be shared using a protocol that does not require prior knowledge of the spectrum occupancy at the receiver. A fountain code may be used for sharing SUM data, which may ensure a very high probability of delivery of a data block through a channel with random erasures. The SUM data sharing protocol may leverage the time-stationarity of HF spectrum occupancy.

In some cases of the first embodiment, the spectrum occupancy may be known to be reciprocal between the transmitter and the receiver (e.g. when the separation distance between the transmitting and receiving nodes are less than 300 km, etc.). This information may be leveraged by obviating the need for sharing SUM data.

A second set of embodiments may include broadcast applications. The same information may be received by a plurality of nodes with unlike interference spectrum occupancies at their respective locations. In these embodiments, the transmit waveform may occupy the entire wideband channel but interference avoidance may be achieved at the receiver by excising subbands matched to the interference spectrum occupancy.

The spectrum excision may be performed by erasing OFDM subcarriers, in embodiments in which OFDM was the waveform used by the transmitter. Other methods of spectrum excision, such as an interference whitening filter, may also be used.

Some embodiments may include methods of communicating through a wireless communication network, using a radio channel and a plurality of transmitters and receivers, in which the band that is occupied by the channel is also partially occupied by narrowband interference, and a transmitter communicates with the receiver using a waveform whose spectrum occupancy adaptively avoids the spectrum occupancy of the interference at the receiver.

In some embodiments, the narrowband interference has a bandwidth that is typically less than 110 Hz. In some embodiments, the medium of communication is the HF band. In some embodiments, the use of the method results in a substantial reduction of transmit power or increased throughput compared to a system that does not so adapt to the spectrum occupancy of the interference at the receiver. In some embodiments, the receiver senses the spectrum occupancy of the received interference during a period of radio silence of the network and communicates to the transmitter a plurality of attributes of the spectrum occupancy of the interference described by a spectrum usability mask.

In some embodiments, the spectrum occupancy of the received interference is determined by computing a discrete Fourier Transform of the received signal. In some embodiments, the spectrum occupancy of the received interference is determined by computing a Fast Fourier Transform of the received signal.

In some embodiments, a transmitter that is within a threshold separation distance from the receiver, such as approximately 300 km, senses the spectrum occupancy of the received interference and uses the said spectrum occupancy to shape the spectrum of signals transmitted by it. Research has shown that, in the HF band, interference spectral occupancy is usually similar at such separations. See e.g., S. Dutta and Gott, G. F., "Correlation of HF interference spectra with range", IEE Proceedings, Vol. 128, Pt. F, No. 4, August 1981. In some embodiments, the spectrum usability mask identifies a threshold level of interference power received by a known subcarrier that is not exceeded when averaged over a known period of time. In some embodiments, the spectrum usability mask identifies upper and lower threshold limits of interference power received by a known subcarrier such that, when the interference power is averaged over a known period of time, the value of the average interference power is bounded by the upper and lower threshold limits.

Some embodiments may include methods of communicating with a transmitter and receiver, using a frequency division multiplexed waveform that includes a plurality of subcarriers, in which some of the subcarriers are suppressed from transmission based on the spectrum usability mask at the receiver. In some embodiments, the power saved by suppressing subcarriers may be applied towards transmitting subcarriers that have not been suppressed.

Some embodiments may include methods of communicating with a transmitter and receiver, using a frequency division multiplexed waveform that includes a plurality of subcarriers, in which the choice of modulation and coding used for each transmitted subcarrier is based on the interference power within the spectrum occupied by the subcarrier at the receiver. In some embodiments, the plurality of subcarriers forms an orthogonal, frequency division multiplexed waveform.

Some embodiments may include methods of receiving a frequency division multiplexed signal, including a plurality of subcarriers carrying modulated data which is demodulated by the receiver into a demodulated data set, in which responsive to determining that some of the subcarriers contain cochannel interference whose power is above a threshold value, the demodulated data carried by the subcarriers containing cochannel interference are erased from the demodulated data set.

Some embodiments may include methods of receiving a frequency division multiplexed signal, including a plurality of subcarriers carrying modulated data which is demodulated by the receiver into a demodulated data set, in which responsive to detecting an uncorrected error in a demodulated data packet, the entire packet is erased from the demodulated data set.

Some embodiments may include methods of communicating a file comprising a finite number of source data packets through a frequency division multiplexed wireless communication channel that is partially occupied by narrowband interference by using a fountain code to encode the source data packets, transmitting the encoded data packets using all subcarriers, regardless of whether they are encountering interference at the receiver, at the receiver-identifying packets that are free of errors, keeping a first count of the number of packets received, and a second count of the number of packets received error free, and continuing to transmit encoded packets until the second count exceeds a threshold, responsive to which the file of transmitted data is decoded.

In some embodiments, the method may include abandoning decoding attempts for the file in instances in which the first count exceeds a maximum value. In some embodiments, a received packet may be erased at the receiver based on knowledge of the interference spectrum occupancy at the receiver. In some embodiments, a received packet may be erased at the receiver based on failing a cyclic redundancy check test on the demodulated packet. In some embodiments, the wireless communication channel includes a single contiguous channel in the radio spectrum.

In some embodiments, the wireless communication channel includes a plurality of discontiguous subchannels in the radio spectrum, the subchannels being of arbitrary bandwidths, and which are aggregated in the receiver to form a contiguous channel at an intermediate frequency. In some embodiments, the intermediate frequency may be zero (0) Hz and the signals may be represented in complex baseband form.

As discussed in detail below, non-contiguous carrier aggregation offers the advantage of pre-selecting less congested, 3 kHz bandwidth, 'standard channels' to synthesize the objective waveform. Assume that out of 16, only 8 standard channels are selected as having usable spectra. In this example, the receiver may indicate the SUM data for these 8 discontiguous, standard channels, including the ID of each of the selected standard channels. On receiving the SUM data for discontiguous channels, the transmitter may synthesize 24 kHz (not 48 kHz) transmission channel, comprising an aggregate of 8 standard channels. A node may process this 24 kHz channel for spectrum excision according to the received SUM data, and then transmit each standard channel at its appropriate frequency in the HF band, which will not be contiguous relative to the other standard channels. The processing of the 24 kHz channel by the transmitter will occur at zero (0) Hz IF, with complex baseband signal representation, which is preferred for a DSP implementation. The receiver will receive the 8 standard channels from their specific, discontiguous frequencies in the HF band and translate them to zero (0) Hz IF, with complex baseband signal representation. That is, the signals may be represented in complex baseband form. At that zero (0) Hz IF, the signals will occupy a band of −12 kHz to +12 kHz, as they did at the transmitter. Thus, from an end-to-end perspective, it will seem as if the channel was 24 kHz wide, although it includes standard channels distributed over 48 kHz in the HF band.

FIG. 14 illustrates a method 1400 of communicating data packets through a wireless communication network in accordance with some embodiments. Method 1400 may be performed by a first node 1450 and/or a second node 1452, any of all of which may be a transceiver device that include an E-WBHF transmitter, receiver, or transceiver (e.g., E-WBHF transmitter 600 illustrated in FIG. 6, WBHF receiver 700 illustrated in FIG. 7, etc.).

In block 1402, the first node 1450 may determine spectrum occupancy attributes of narrowband interference on a communication channel at the location of the first node 1450 (i.e., at its current location). In some embodiments, determining the spectrum occupancy attributes in block 1402 may include the first node 1450 sensing the power spectral density of the narrowband interference during a period of radio silence, and generating a spectrum usability mask from the sensed power spectral density. In some embodiments, determining the spectrum occupancy attributes in block 1402 may include the first node 1450 computing a power spectral density of the waveform based on a discrete Fourier transform (or based on a fast Fourier transform, etc.), and generating a spectrum usability mask by quantizing the power spectral density relative to a set of threshold values. In some embodiments, generating the spectrum usability mask in block 1402 may include the first node 1450 identifying a threshold level of interference power received by a known subcarrier that is not exceeded when averaged over a known period of time. In some embodiments, generating the spectrum usability mask in block 1402 may include the first node 1450 identifying upper and lower threshold limits of interference power received by a known subcarrier such that, when the interference power is averaged over a known period of time, the value of the average interference power is bounded by the upper and lower threshold limits. In block 1404, the first node 1450 may broadcast the determined spectrum occupancy attributes for reception by one or more other nodes.

In block 1406, the second node 1452 may receive a broadcast that includes spectrum occupancy attributes of narrowband interference on a communication channel at the location of first node 1450.

In block 1408, the second node 1452 may generate or spectrally shape a waveform (e.g., multicarrier OFDM waveform illustrated in FIG. 1, etc.) based on the spectrum occupancy attributes of the narrowband interference on the communication channel at the location of the first node 1450, and transmit a data packet to the first node 1450 using the waveform generated based on the spectrum occupancy attributes of the narrowband interference on the communication channel at the location of the first node 1450.

In some embodiments, transmitting the data packet in block 1408 may include the second node 1452 using a frequency division multiplexed waveform that includes a plurality of subcarriers (e.g., a plurality of mutually orthogonal subcarriers, each subcarrier being modulated with a subset of the data contained in one transmit interleaving block.), and suppressing at least some of the subcarriers from transmission based on the spectrum occupancy attributes of the narrowband interference on the communication channel. In some embodiments, the second node 1452 may be configured to apply the power that is saved by suppressing the subcarriers towards transmitting the subcarriers that have not been suppressed.

In some embodiments, transmitting the data packet in block 1408 may include the second node 1452 selecting a modulation and coding scheme for each transmitted subcarrier based on an interference power within spectrum occupied by the subcarrier at the first node 1450.

In block 1410, the first node 1450 may receive the data packets via the waveform generated based on the spectrum occupancy attributes of the narrowband interference on the communication channel at the location of first node 1450.

In some embodiments, such as long range broadcast data communications, the spectrum occupancy attributes may be dissimilar at the plurality of receiving first nodes 1450. In this case, second node 1452 may transmit on all subcarriers, regardless of the spectrum occupancy attributes at the locations of first nodes 1450. In this broadcast case, the first nodes 1450 may generate a demodulated data set by demodulating modulated data carried by subcarriers in the waveform, and erase the data carried by the subcarriers of the waveform that include cochannel interference.

In some broadcast embodiments as described above, the first nodes 1450 may generate a demodulated data set by demodulating modulated data carried by subcarriers in the waveform, determine whether the demodulated data set includes a demodulated data packet that includes an uncorrected error, and erase the demodulated data packet in response to determining that the demodulated data set includes the demodulated data packet that includes the uncorrected error.

In some broadcast embodiments as described above, the first nodes 1450 may identify packets that are free of errors, maintain a first count of the number of packets received in the receiver device, and maintain a second count of the number of packets received error free in the receiver device.

Figure 15:
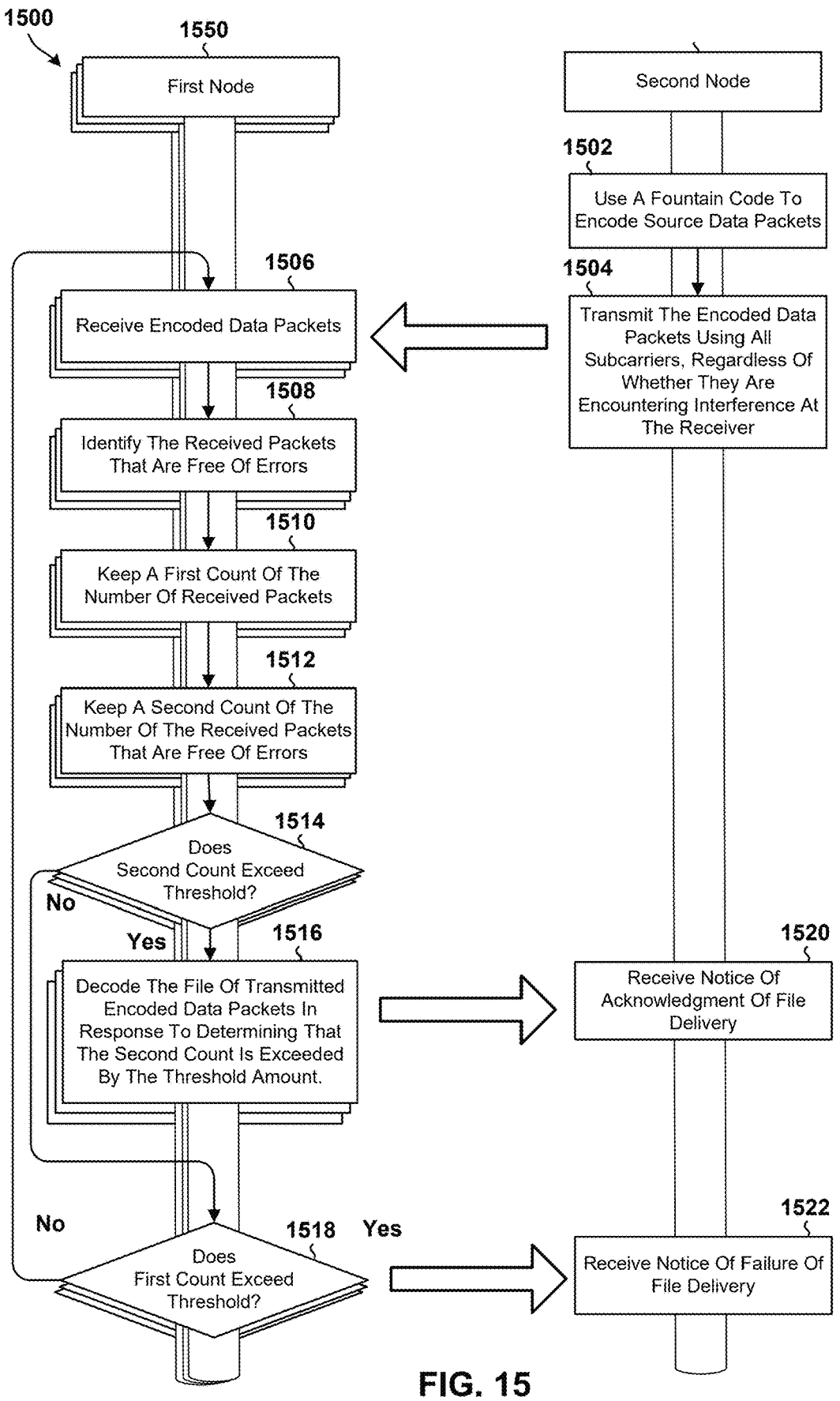
FIG. 15 is a process flow diagram that illustrates a method of communicating a file that includes a finite number of source data packets through a frequency division multiplexed wireless communication channel that is partially occupied by narrowband interference in accordance with some embodiments.

FIG. 15 illustrates a method 1500 of communicating a file that includes a finite number of source data packets through a frequency division multiplexed wireless communication channel that is partially occupied by narrowband interference in accordance with some embodiments. Method 1500 may be performed by a plurality of first nodes 1550 and/or a second node 1552, any or all of which may be a transceiver device that includes an E-WBHF transmitter, receiver, or transceiver (e.g., E-WBHF transmitter 600 illustrated in FIG. 6, WBHF receiver 700 illustrated in FIG. 7, etc.).

In some embodiments, the file (and source data packets) may include information about the spectral occupancy of interference received by the second node 1552, and the second node 1552 may broadcast the spectral occupancy information for reception by the plurality of first nodes 1550. In some embodiments, the file (and source data packets) may include user data, and the second node 1552 may broadcast the file for reception by a plurality of plurality of first nodes 1550 having dissimilar interference spectral occupancies at their respective locations.

With reference to FIG. 15, in block 1502, the second node 1552 may use a fountain code to encode the source data packets of the file. As discussed above, fountain codes may make optimal use of spectrum that is partially blocked by narrowband interference. If some of the packets get through error free, exploiting the spectral gaps in the band, the entire file may be decoded error free with high confidence if the number of received error-free packets exceeds a threshold, $N_{threshold}$, where $N_{threshold}$ marginally exceeds the number of packets in the file. As such, a fountain code may be used in block 1502 to, for example, share spectrum usability mask (SUM) data with other nodes in the network and/or to assure, with very high confidence, that all nodes have error free copies of the SUM data of every node of the network. The fountain code may also be used for long-range broadcast traffic, where the receivers are at a distance greater than a minimum limit, such as 300 km, beyond which range the interference spectrum occupancy is typically uncorrelated.

In block 1504, the second node 1552 may commence transmitting the encoded data packets of the file to one or more of the plurality of first nodes 1550, using all subcarriers regardless of whether they are encountering interference at the receiver (first nodes 1550). The second node 1552 may continue to transmit the encoded packets until either an acknowledgment of file delivery message is received in block 1520 or a failure of file delivery message is received in block 1522 from a threshold number of first nodes 1550.

In block 1506, a first node 1550 may commence receiving encoded data packets. For example, as discussed above with reference to block 1302 of FIG. 13, the first node 1550 may receive a data packet from unoccupied SCs in the interleaving block (IL block) in block 1506.

In block 1508, the first node 1550 may identify the received packets that are free of errors. For example, as discussed above with reference to block 1304 of FIG. 13, the first node 1550 may determine whether the received data packet passes a cyclic redundancy check (CRC) in block 1508. As discussed above with reference to block 1306 of FIG. 13, in some embodiments, the first node 1550 may be further configured to erase one or more demodulated packets in response to determining that the demodulated packet failed the CRC test. In some embodiments, the first node 1550 may be configured to erase one or more received packets based on spectrum occupancy attributes of narrowband interference on the communication channel at the location of the second node 1552.

In block 1510, the first node 1550 may keep a first count of the number of received packets. In block 1512, the first node 1550 may keep a second count of the number of received packets that are free of errors. For example, as discussed above with reference to block 1308 of FIG. 13, the first node 1550 may update a first counter (M) for demodulated packets and update a second counter (N) for error free packets in blocks 1510 and 1512.

In determination block 1514, the first node 1550 may determine whether the second count exceeds a threshold. For example, as discussed above with reference to block 1312 of FIG. 13, the first node 1550 may determine whether the value of a second counter (N) exceeds a threshold value ($N_{threshold}$) in block 1514.

In response to determining that the second count exceeds a threshold (i.e., determination block 1514="Yes"), the first node 1550 may decode the file of transmitted encoded data packets in block 1516. For example, as discussed above with reference to blocks 1318-1324 of FIG. 13, the first node 1550 may generate a [G] matrix, invert the [G] matrix, compute the inner product (e.g., by performing $t_n = \Sigma [s_k]^T \cdot [G_{kn}]^{-1}$, etc.), and send the decoded packets ($t_n$) to a data sink (e.g., data sink 728 illustrated in FIG. 7, etc.) in block 1516. In addition, the first node 1550 may send a notice of acknowledgment of file delivery to the second node 1552 in block 1516.

In response to determining that the second count does not exceed the threshold (i.e., determination block 1514="No"), the first node 1550 may determine whether the first count exceeds a threshold in determination block 1518. For example, as discussed above with reference to block 1314 of FIG. 13, the first node 1550 may determine whether the value of the first counter (M) exceeds a threshold value (e.g., maximum number of decoding attempts, $M_{max}$, etc.) in determination block 1518.

In response to determining that the first count does not exceed the threshold (i.e., determination block 1518="No"), the first node 1550 may continue to receive and count the data packets by repeating the operations in blocks 1506-1516. In response to determining that the first count exceeds the threshold (i.e., determination block 1518="Yes"), the first node 1550 may abandon any decoding attempts for the file and send a notice of failure of file delivery to the second node 1552 to indicate an error condition.

The various embodiments may be implemented on a number of multicore and multiprocessor systems, including a system-on-chip (SOC). An SOC may be a single integrated circuit (IC) chip that contains multiple resources or independent processors integrated on a single substrate. A single SoC may contain circuitry for digital, analog, mixed-signal, and radio-frequency functions. A single SoC also may include any number of general purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling the integrated resources and processors, as well as for controlling peripheral devices. A multicore processor may be a single integrated circuit (IC) chip or chip package that contains two or more independent processing cores (e.g., CPU core, modem processor core, etc.) configured to read and execute program instructions. A SoC may include multiple multicore processors, and each processor in an SoC may be referred to as a core. A multiprocessor may be a system or device that includes two or more processing units configured to read and execute program instructions.

Figure 16:
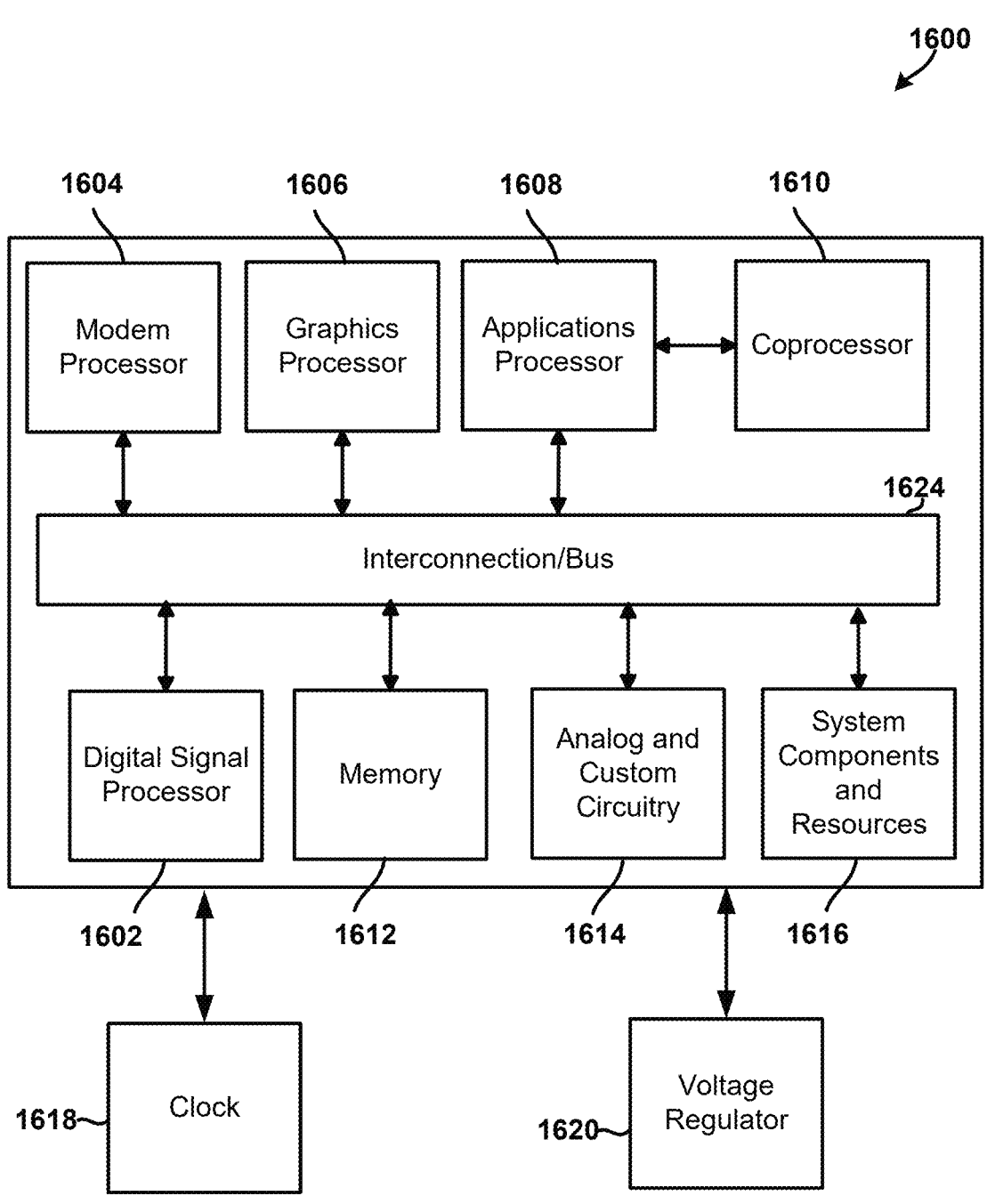
FIG. 16 is a component block diagram illustrating an example system on chip (SOC) that could be configured to implement the various embodiments.

FIG. 16 is an architectural diagram illustrating an example system-on-chip (SOC) 1600 architecture that may be used to implement the various aspects. The SOC 1600 may include a number of heterogeneous processors, such as a digital signal processor (DSP) 1602, a modem processor 1604, a graphics processor 1606, and an application processor 1608. The SOC 1600 may also include one or more coprocessors 1610 (e.g., vector co-processor) connected to one or more of the processors 1602, 1604, 1606, 1608. Each processor 1602, 1604, 1606, 1608, 1610 may include one or more cores, and each processor/core may perform operations independent of the other processors/cores. For example, the SOC 1600 may include a processor that executes a first type of operating system (e.g., FreeBSD, LINIX, OS X, etc.) and a processor that executes a second type of operating system (e.g., Microsoft Windows 11, etc.).

The SOC 1600 may also include analog circuitry and custom circuitry 1614 for managing sensor data, analog-to-digital conversions, wireless data transmissions, and for performing other specialized operations, such as processing encoded audio signals for games and movies. The SOC 1600 may further include system components and resources 1616, such as voltage regulators, oscillators, phase-locked loops, peripheral bridges, data controllers, memory controllers, system controllers, access ports, timers, and other similar components used to support the processors and clients running on a computing device.

The system components 1616 and custom circuitry 1614 may include circuitry to interface with peripheral devices, such as cameras, electronic displays, wireless communication devices, external memory chips, etc. The processors 1602, 1604, 1606, 1608 may be interconnected to one or more memory elements 1612, system components and resources 1616 and custom circuitry 1614 via an interconnection/bus module 1624, which may include an array of reconfigurable logic gates and/or implement a bus architecture (e.g., CoreConnect, AMBA, etc.). Communications may be provided by advanced interconnects, such as high performance networks-on chip (NoCs).

The SOC 1600 may further include an input/output module (not illustrated) for communicating with resources external to the SOC, such as a clock 1618 and a voltage regulator 1620. Resources external to the SOC (e.g., clock 1618, voltage regulator 1620) may be shared by two or more of the internal SOC processors/cores (e.g., DSP 1602, modem processor 1604, graphics processor 1606, applications processor 1608, etc.).

In addition to the SOC 1600 discussed above, the various aspects may be implemented in a wide variety of computing systems, which may include a single processor, multiple processors, multicore processors, or any combination thereof.

Figure 17:
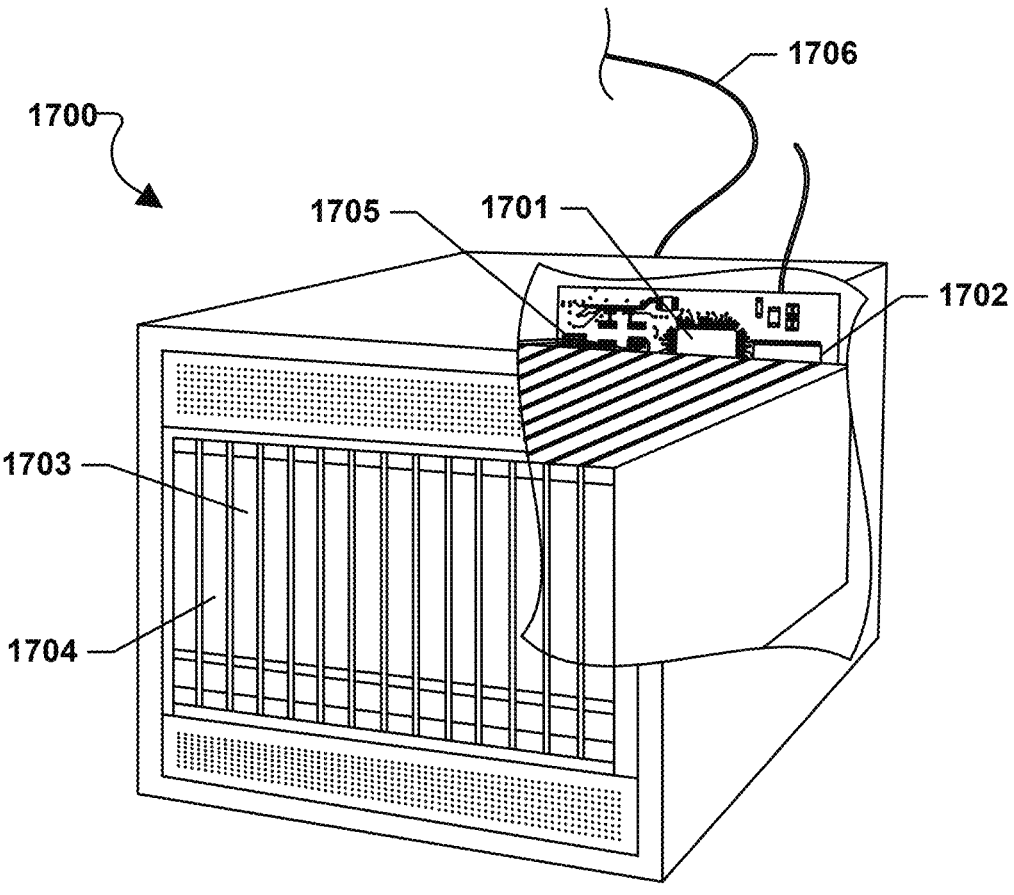
FIG. 17 is a component block diagram illustrating an example server computing device that could be configured to implement the various embodiments.

Some embodiments may be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1703. The server 1700 may also include a floppy disc drive, compact disc (CD) or DVD disc drive 1704 coupled to the processor 1701. The server 1700 may also include network access ports 1705 coupled to the processor 1701 for establishing data connections with a network 1706, such as a local area network coupled to other operator network computers and servers.

The processor 1701 may be any programmable microprocessor, microcomputer or multiple processor chip or chips that can be configured by software instructions (applications) to perform a variety of functions, including the functions of the various embodiments described below. Multiple processors 1701 may be provided, such as one processor dedicated to wireless communication functions and one processor dedicated to running other applications. Typically, software applications may be stored in the internal memory before they are accessed and loaded into the processor 1701. The processor 1701 may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 1200 and 1300 may be substituted for or combined with one or more operations of any of methods 1200 and 1300.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method of communicating data packets through a wireless communication network, comprising:

receiving, by a transceiver device from a receiver device, spectrum occupancy attributes of narrowband interference on a communication channel at a location of the receiver device; and transmitting, from the transceiver device to the receiver device, a data packet using a waveform having a spectrum occupancy that is based on the spectrum occupancy attributes of the narrowband interference on the communication channel at the location of the receiver device.

2. The method of claim 1, wherein transmitting the data packet using the waveform generated based on the spectrum occupancy attributes of the narrowband interference on the communication channel at the location of the receiver device comprises:

transmitting the data packet using a frequency division multiplexed waveform comprising a plurality of subcarriers and suppressing at least some of the subcarriers from transmission based on the spectrum occupancy attributes of the narrowband interference on the communication channel; and assigning user data to be carried only by the transmitted subcarriers.

3. The method of claim 2, wherein transmitting the data packet using the frequency division multiplexed waveform comprising the plurality of subcarriers comprises:

transmitting the data packet using a frequency division multiplexed waveform that includes a plurality of mutually orthogonal subcarriers, wherein each of the mutually orthogonal subcarriers is modulated with a subset of the data contained in one transmit interleaving block.

4. The method of claim 2, further comprising applying power saved by suppressing the subcarriers towards transmitting the subcarriers that have not been suppressed.

5. The method of claim 1, wherein transmitting the data packet using the waveform generated based on the spectrum occupancy attributes of the narrowband interference on the communication channel at the location of the receiver device comprises:

selecting a modulation and coding scheme for each transmitted subcarrier based on an interference power within spectrum occupied by the subcarrier at the receiver device.

6. The method of claim 1, wherein transmitting the data packet using the waveform generated based on the spectrum occupancy attributes of the narrowband interference on the communication channel at the location of the receiver device comprises:

generating the waveform based on the spectrum occupancy attributes of the narrowband interference on the communication channel at the location of the transceiver device.

7. The method of claim 1, further comprising:

determining, by the transceiver device, spectrum occupancy attributes of narrowband interference on the communication channel at the location of the transceiver device; and broadcasting, by the transceiver device, the determined spectrum occupancy attributes for reception by one or more other devices.

8. The method of claim 7, wherein determining the spectrum occupancy attributes of the narrowband interference on the communication channel comprises:

sensing a power spectral density of the narrowband interference during a period of radio silence; and generating a spectrum usability mask from the sensed power spectral density.

9. The method of claim 7, wherein determining the spectrum occupancy attributes of narrowband interference on the communication channel at the location of the receiver device comprises:

computing a power spectral density of the waveform:

based on a discrete Fourier transform, or based on a fast Fourier transform; and generating a spectrum usability mask by quantizing the power spectral density relative to a set of threshold values.

10. The method of claim 9, wherein generating the spectrum usability mask by quantizing the power spectral density relative to the set of threshold values comprises:

identifying a threshold level of interference power received by a known subcarrier that is not exceeded when averaged over a known period of time.

11. The method of claim 9, wherein generating the spectrum usability mask by quantizing the power spectral density relative to the set of threshold values comprises:

identifying upper and lower threshold limits of interference power received by a known subcarrier such that, when the interference power is averaged over a known period of time, a value of the average interference power is bounded by the upper and lower threshold limits.

12. The method of claim 7, further comprising:

generating a demodulated data set by demodulating modulated data carried by subcarriers in the waveform; and erasing data carried by the subcarriers of the waveform that include cochannel interference.

13. The method of claim 7, further comprising:

generating a demodulated data set by demodulating modulated data carried by subcarriers in the waveform;

determining whether the demodulated data set includes a demodulated data packet that includes an uncorrected error; and erasing the demodulated data packet in response to determining that the demodulated data set includes the demodulated data packet that includes the uncorrected error.

14. The method of claim 7, further comprising:

identifying packets that are free of errors;

maintaining a first count of the number of packets received in the receiver device; and maintaining a second count of the number of packets received error free in the receiver device.

15. The method of claim 7, wherein the communication channel comprises a plurality of discontiguous subchannels in the radio spectrum, the subchannels having arbitrary bandwidths, the method further comprising:

aggregating, by a transceiver device, the plurality of discontiguous subchannels to form a contiguous channel at an intermediate frequency.

16. The method of claim 15, wherein:

the intermediate frequency in the transceiver device is zero Hz; and the signals are represented in the transceiver device in complex baseband form.

17. A transceiver device, comprising:

a processor configured to:

receive, from a receiver device, spectrum occupancy attributes of narrowband interference on a communication channel at a location of the receiver device; and transmit, to the receiver device, a data packet using a waveform having a spectrum occupancy that is based on the spectrum occupancy attributes of the narrowband interference on the communication channel at the location of the receiver device.

18. The transceiver device of claim 17, wherein the processor is configured to transmit the data packet using the waveform generated based on the spectrum occupancy attributes of the narrowband interference on the communication channel at the location of the receiver device by:

transmitting the data packet using a frequency division multiplexed waveform comprising a plurality of subcarriers and suppressing at least some of the subcarriers from transmission based on the spectrum occupancy attributes of the narrowband interference on the communication channel; and assigning user data to be carried only by the transmitted subcarriers.

19. The transceiver device of claim 18, wherein the processor is configured to transmit the data packet using the frequency division multiplexed waveform comprising the plurality of subcarriers by:

transmitting the data packet using a frequency division multiplexed waveform comprising a plurality of mutually orthogonal subcarriers, wherein each of the mutually orthogonal subcarriers is modulated with a subset of the data contained in one transmit interleaving block.

20. The transceiver device of claim 18, wherein the processor is further configured to apply power saved by suppressing the subcarriers towards transmitting the subcarriers that have not been suppressed.

21. The transceiver device of claim 17, wherein the processor is further configured to:

select a modulation and coding scheme for each transmitted subcarrier based on an interference power within spectrum occupied by the subcarrier at the receiver device.

22. The transceiver device of claim 17, wherein the processor is further configured to:

generate the waveform based on the spectrum occupancy attributes of the narrowband interference on the communication channel at the location of the transceiver device.

23. The transceiver device of claim 17, wherein the processor is further configured to:

determine the spectrum occupancy attributes of narrowband interference on the communication channel at the location of the transceiver device; and broadcast the determined spectrum occupancy attributes for reception by one or more other devices.

24. The transceiver device of claim 23, wherein the processor is configured to determine the spectrum occupancy attributes of the narrowband interference on the communication channel by performing operations that include:

sensing a power spectral density of the narrowband interference during a period of radio silence; and generating a spectrum usability mask from the sensed power spectral density.

25. The transceiver device of claim 23, wherein the processor is configured to determine the spectrum occupancy attributes of the narrowband interference on the communication channel by performing operations that include:

computing a power spectral density of the waveform:
based on a discrete Fourier transform, or
based on a fast Fourier transform; and generating a spectrum usability mask by quantizing the power spectral density relative to a set of threshold values.

26. The transceiver device of claim 25, wherein the processor is configured to generate the spectrum usability mask by quantizing the power spectral density relative to the set of threshold values by performing operations that include:

identifying a threshold level of interference power received by a known subcarrier that is not exceeded when averaged over a known period of time.

27. The transceiver device of claim 25, wherein the processor is configured to generate the spectrum usability mask by quantizing the power spectral density relative to the set of threshold values by performing operations that include:

identifying upper and lower threshold limits of interference power received by a known subcarrier such that, when the interference power is averaged over a known period of time, a value of the average interference power is bounded by the upper and lower threshold limits.

28. The transceiver device of claim 23, wherein the processor is further configured to:

generate a demodulated data set by demodulating modulated data carried by subcarriers in the waveform; and erase data carried by the subcarriers of the waveform that include cochannel interference.

29. The transceiver device of claim 23, wherein the processor is further configured to:

generate a demodulated data set by demodulating modulated data carried by subcarriers in the waveform;

determine whether the demodulated data set includes a demodulated data packet that includes an uncorrected error; and erase the demodulated data packet in response to determining that the demodulated data set includes the demodulated data packet that includes the uncorrected error.

30. The transceiver device of claim 23, wherein the processor is further configured to:

identify packets that are free of errors;

maintain a first count of the number of packets received in the receiver device; and maintain a second count of the number of packets received error free in the receiver device.

31. The transceiver device of claim 23, wherein:

the communication channel comprises a plurality of discontiguous subchannels in the radio spectrum, the subchannels having arbitrary bandwidths; and the transceiver device is configured to aggregate the plurality of discontiguous subchannels to form a contiguous channel at an intermediate frequency.

32. The transceiver device of claim 31, wherein:

the intermediate frequency is zero Hz; and the processed signals are represented in complex baseband form.

* * * * *